(12) United States Patent
Tanaka et al.

(10) Patent No.: US 8,033,568 B2
(45) Date of Patent: Oct. 11, 2011

(54) HEAD-PROTECTING AIRBAG

(75) Inventors: Motoyuki Tanaka, Aichi-ken (JP); Yoshio Mizuno, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 183 days.

(21) Appl. No.: 12/320,810

(22) Filed: Feb. 5, 2009

(65) Prior Publication Data
US 2009/0236829 A1 Sep. 24, 2009

(30) Foreign Application Priority Data
Mar. 24, 2008 (JP) ................................ 2008-076450

(51) Int. Cl.
*B60R 21/233* (2006.01)
(52) U.S. Cl. .................... 280/729; 280/730.2; 280/743.1
(58) Field of Classification Search .................. 280/729, 280/730.2, 743.1
See application file for complete search history.

(56) References Cited

U.S. PATENT DOCUMENTS

| | | | | |
|---|---|---|---|---|
| 6,450,527 B2 * | 9/2002 | Kobayashi et al. | ........... | 280/729 |
| 6,471,240 B2 * | 10/2002 | Bakhsh et al. | ........... | 280/729 |
| 6,758,492 B2 * | 7/2004 | Tesch | .......... | 280/730.2 |
| 6,971,665 B2 * | 12/2005 | Tanaka | ........... | 280/729 |
| 7,080,853 B2 * | 7/2006 | Ogata | ......... | 280/730.2 |
| 2004/0007857 A1 * | 1/2004 | Sonnenberg et al. | ...... | 280/730.2 |
| 2004/0251666 A1 * | 12/2004 | Shaker et al. | ............... | 280/730.2 |
| 2005/0134025 A1 * | 6/2005 | Ridella et al. | ............... | 280/730.2 |
| 2007/0102904 A1 * | 5/2007 | Bowers | ........................ | 280/729 |
| 2008/0309056 A1 * | 12/2008 | Ohba | ........................ | 280/730.2 |
| 2009/0026742 A1 * | 1/2009 | Noguchi et al. | ........... | 280/730.2 |

FOREIGN PATENT DOCUMENTS

| | | | |
|---|---|---|---|
| DE | 10 2004 033012 | * | 3/2006 |
| EP | 1 544 056 | * | 6/2005 |
| GB | 2 399 548 | * | 9/2004 |
| JP | A-2004-034766 | | 2/2004 |
| JP | 2004-82951 | * | 3/2004 |
| JP | A-2007-161167 | | 6/2007 |

* cited by examiner

*Primary Examiner* — Eric Culbreth
*Assistant Examiner* — George D. Spisich
(74) *Attorney, Agent, or Firm* — Posz Law Group, PLC

(57) ABSTRACT

A head-protecting airbag adapted to be mounted on an upper periphery of a window of a vehicle for deployment downward to cover the window includes a primary inflatable portion that includes a protection portion for receiving an occupant's head and a secondary inflatable portion that admits inflation gas of the primary inflatable portion and is inflatable secondarily for preventing a pressure increase of the primary inflatable portion. The primary inflatable portion and the secondary inflatable portion are communicated with a tubular conduit. The protection portion includes an inlet-side inflatable portion located proximate an inlet port of the conduit and a lower inflatable portion located below the conduit. The lower inflatable portion is communicated with part of the inlet-side inflatable portion and has an opening dimension in a vertical direction that is greater than that of the conduit over an entire area below the conduit.

10 Claims, 16 Drawing Sheets

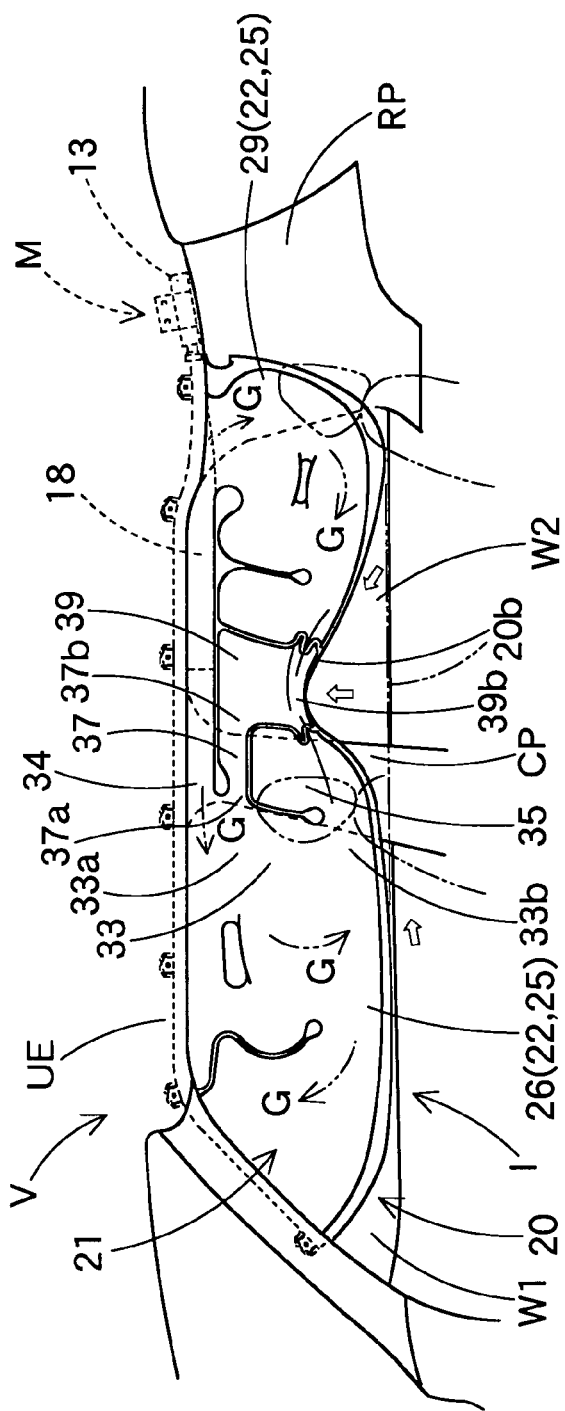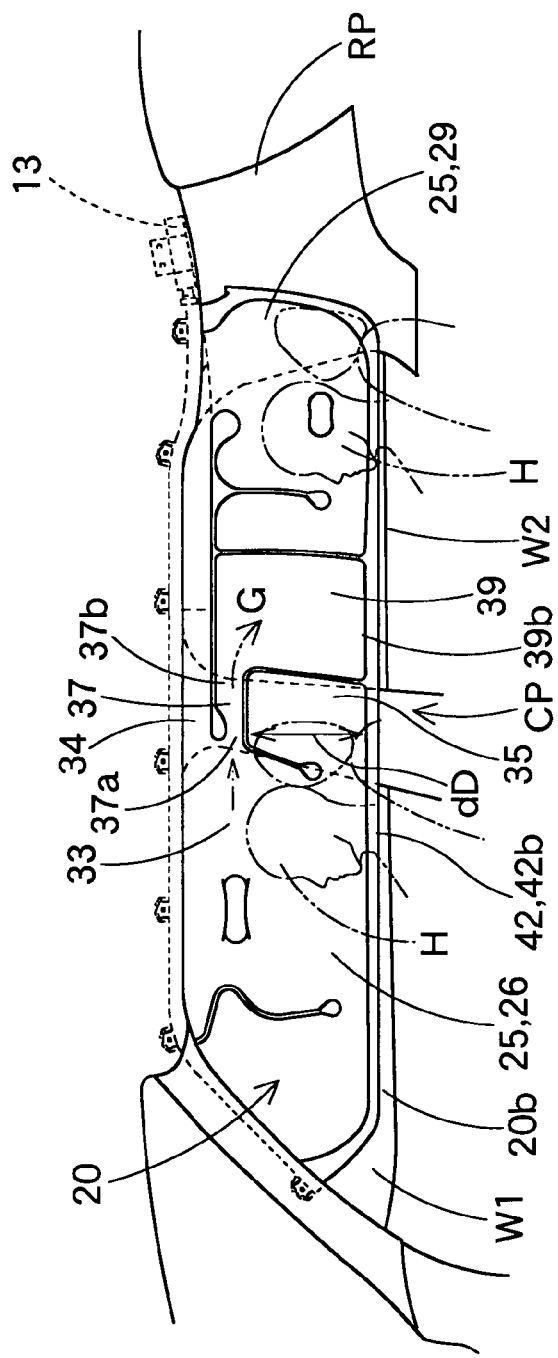
Fig. 8A
Fig. 8B

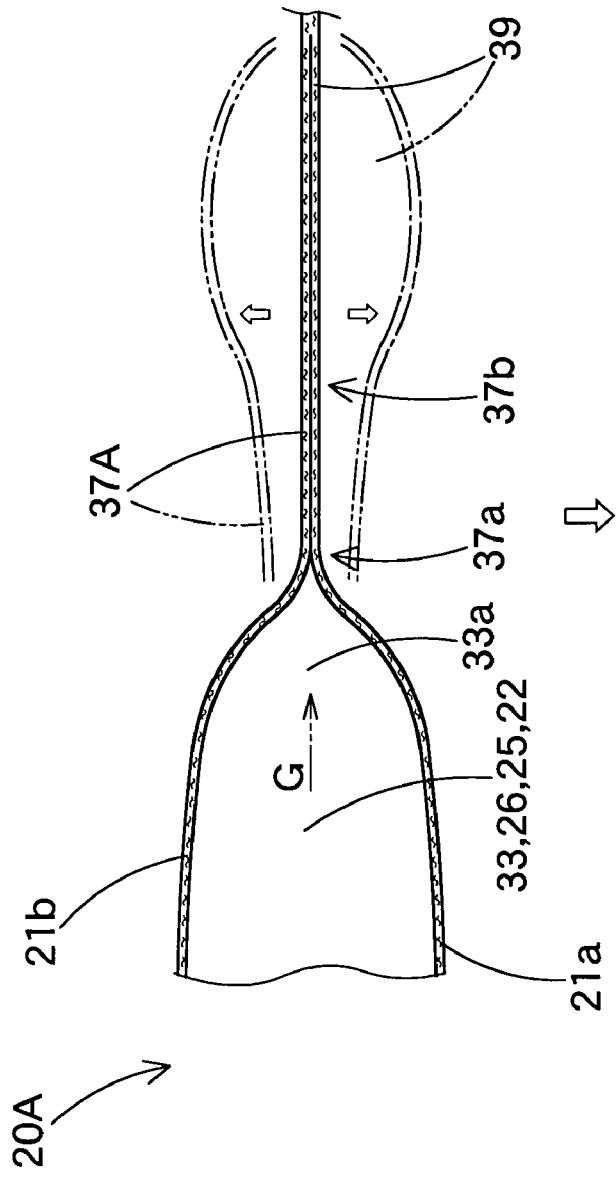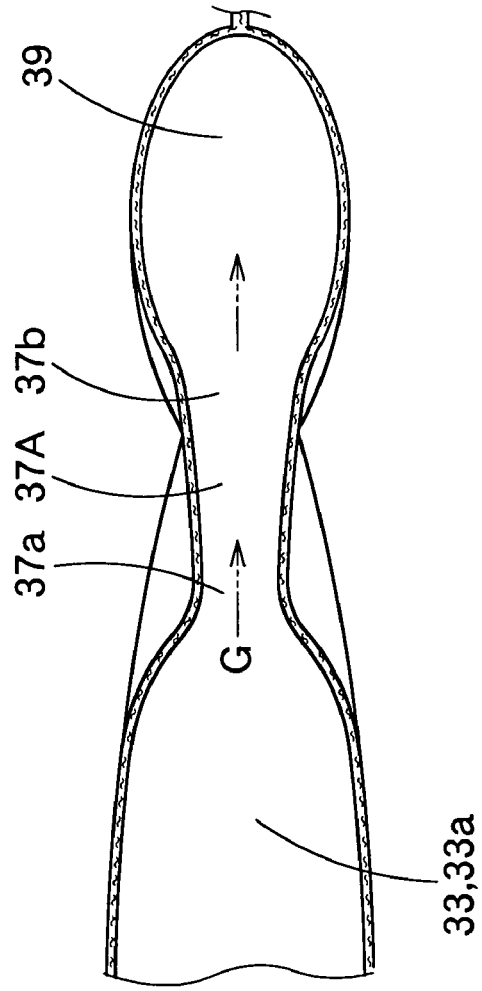
Fig.13A
Fig.13B

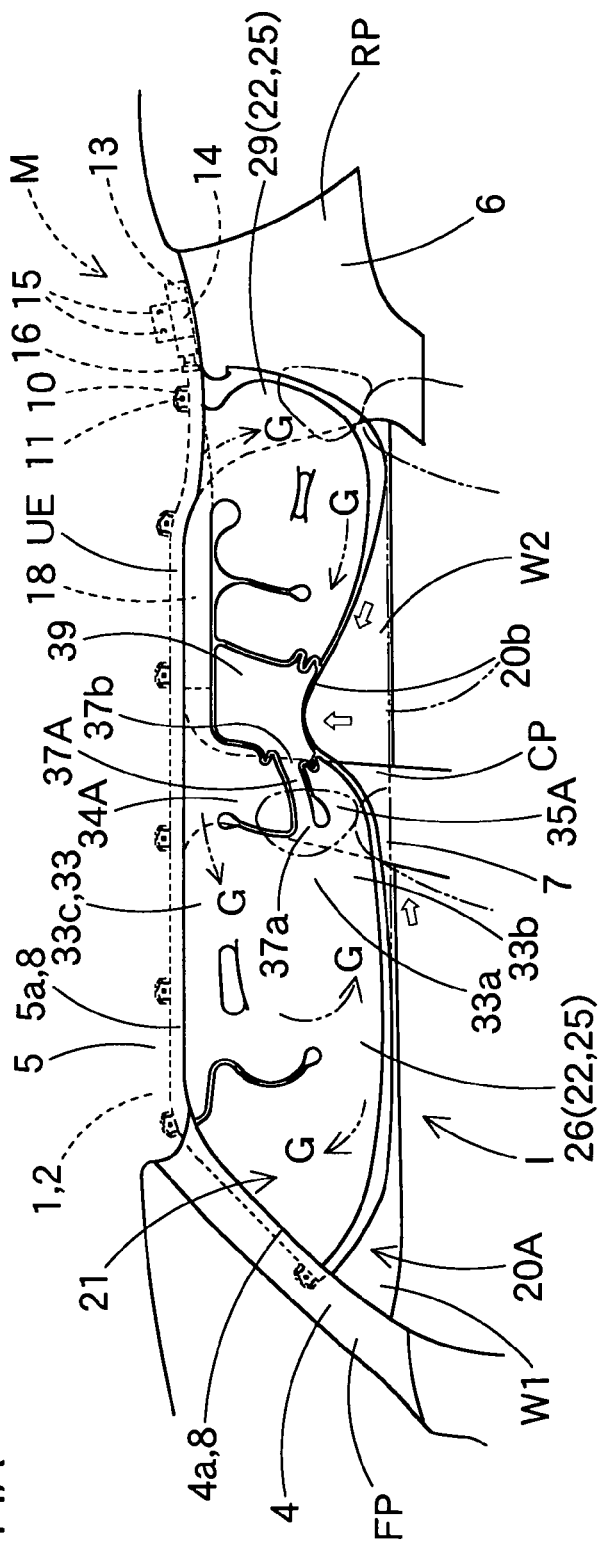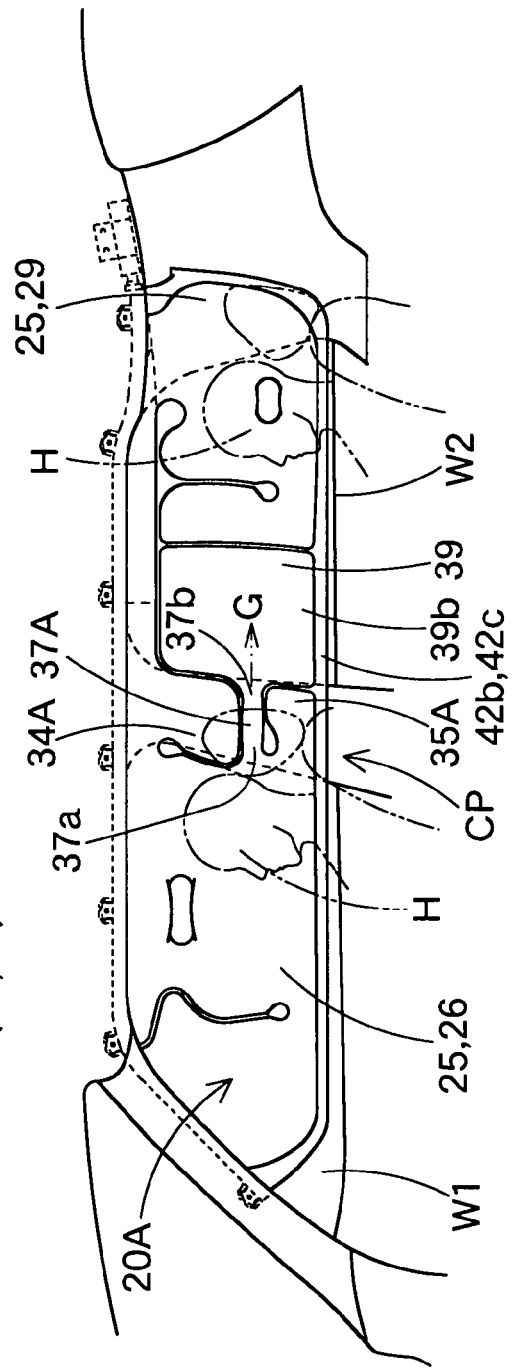
Fig. 14A
Fig. 14B

HEAD-PROTECTING AIRBAG

The present application claims priority from Japanese Patent Application No. 2008-076450 of Tanaka et al., filed on Mar. 24, 2008, the disclosure of which is hereby incorporated into the present application by reference.

BACKGROUND OF THE INVENTION

1. Field of the Invention

The present invention relates to a head-protecting airbag housed in an upper periphery of a window (or side window) inside of a vehicle for deployment downward to protect a head of an occupant.

2. Description of Related Art

In the prior art, JP 2004-034766 A and JP 2007-161167 A are illustrative of conventional head-protecting airbags. Each of these airbags includes a gas admissive portion that is inflatable with inflation gas by separating an inner panel and an outer panel and a non-admissive portion that admits no inflation gas and keeps the inner panel and outer panel attached together. The gas admissive portion includes a primary inflatable portion that inflates in an early stage of airbag deployment and a secondary inflatable portion (also called a sub chamber or sub inflatable portion) communicated with the primary inflatable portion. The primary inflatable portion includes a protection portion for receiving a head of an occupant and, the protection portion and the secondary inflatable portion are communicated with each other by a conduit (also called a vent hole or constricted portion) that is tubular in shape. The secondary inflatable portion is provided to absorb inflation gas from the protection portion of the primary inflatable portion at the pressure increase of the protection portion in order to reduce a reaction force of the protection portion which may otherwise be applied to the occupant's head when the protection portion receives the head. The conduit includes an inlet at a side of the protection portion and an outlet to the secondary inflatable portion, and is located proximate the lower periphery of the airbag. In order that the inflation gas is fed to the secondary inflatable portion after the protection portion completes inflation, not immediately, the conduit has a length of a certain degree and a restrained opening dimension in a direction orthogonal to the axial direction from the inlet to the outlet to some extent.

However, at deployment of such conventional airbags, the primary inflatable portion unfurls and inflates downward with the secondary inflatable portion kept uninflated, and then the lower periphery of the airbag tends to move upward as a reaction to the downward deployment. That is, immediately after the completion of inflation of the primary inflatable portion, the secondary inflatable portion as well as the conduit located proximate the lower periphery of the airbag are likely to bend upward and cave in since they are not inflated.

These events may cause a bend of, i.e. occlusion of the conduit. If the occupant's head hits the protection portion and increases the inner pressure of the protection portion with the conduit occluded, the inflation gas inside the protection portion is not fed to the secondary inflatable portion, such that the protection portion cannot avoid the increase of internal pressure.

SUMMARY OF THE INVENTION

The present invention contemplates to solve the above-described problems, and therefore, has an object to provide a head-protecting airbag that can prevent the occlusion of the conduit right after the completion of inflation of the primary inflatable portion and thus avoid the increase of internal pressure of the protection portion in a steady fashion.

The head-protecting airbag of the invention is mountable on an upper periphery of a window of a vehicle inside the vehicle for deployment downward to cover the window. The airbag includes a gas admissive portion that is inflatable with inflation gas by separating an inner panel and an outer panel and a non-admissive portion that admits no inflation gas and keeps the inner panel and outer panel attached together. The gas admissive portion includes a primary inflatable portion inflatable in an early stage of airbag deployment and a secondary inflatable portion that is communicated with the primary inflatable portion and admits inflation gas from the primary inflatable portion for restraining a pressure increase of the primary inflatable portion. The primary inflatable portion includes a protection portion that receives and protects a head of an occupant and a tubular conduit that communicates the protection portion and the secondary inflatable portion. The non-admissive portion includes a peripheral portion located on an outer periphery of the gas admissive portion and a partitioning portion that defines boundaries of the secondary inflatable portion and the conduit.

The secondary inflatable portion is located adjacent the protection portion of the primary inflatable portion in an anteroposterior direction of the airbag at full deployment. The conduit extends along an anteroposterior direction of the airbag from an inlet port at a side of the protection portion to an outlet port to the secondary inflatable portion and is located in an upper area of the airbag away from a lower periphery of the airbag. The protection portion includes an inlet-side inflatable portion located proximate the inlet port of the conduit and a lower inflatable portion that is partitioned from the conduit by the partitioning portion and located below the conduit between the conduit and a bottom area of the peripheral portion. The inlet-side inflatable portion includes an opposing region that is communicated with and adjacent the inlet port of the conduit in an anteroposterior direction and a lower extending region that extends downward from the opposing region. The lower inflatable portion is communicated with the lower extending region so as to be inflatable generally simultaneously with the inlet-side inflatable portion upon inflation of the primary inflatable portion and has an opening dimension in a vertical direction that is greater than that of the conduit over an entire area below the conduit.

In operation of the airbag of the invention, the primary inflatable portion completes deployment firstly and covers interiors of the window. At this time, in an area extending downward from the inlet port of the conduit, the inlet-side inflatable potion and the lower inflatable portion inflate in a generally L shape in such a manner as to surround the conduit from underside. The opening dimension in a vertical direction of the lower inflatable portion is designed greater than that of the conduit over an entire area below the conduit such that the lower inflatable portion retains its shape and does not cause an occlusion of the conduit when the lower periphery of the airbag moves upward on the rebound of deployment, immediately after the completion of deployment of the primary inflatable potion.

Accordingly, even in the event that the lower periphery of the airbag moves upward as a reaction to a downward deployment of the primary inflatable portion while the secondary inflatable portion is not yet inflated, the L-shaped inflated region comprised of the inlet-side inflatable portion and lower inflatable portion and extending downward from the inlet port of the conduit resists the rebound and prevents the conduit from collapsing or bending to occlusion, thus securing a communication from the inlet port to the outlet port.

Thereafter, when the protection portion receives an occupant's head and an inner pressure of the protection portion is going to rise, the inflation gas inside the protection portion smoothly flows into the secondary inflatable portion via an unoccluded, open passage of the conduit, thus restraining a pressure increase of the protection portion in a stable manner.

Therefore, the airbag of the invention can prevent an occlusion of the conduit and an increase of internal pressure of the protection portion that may be caused by the occlusion right after the completion of inflation of the primary inflatable portion.

In the airbag of the invention, the conduit is formed in such a manner as to project into the protection portion, not into the secondary inflatable portion. Nevertheless, this configuration does not inhibit a cushioning property of the protection portion because the conduit is formed such that its axial direction extends in an anteroposterior direction from the inlet port from the protection portion to the outlet port to the secondary inflatable portion, and therefore it is not that such a continuous thin area, of the conduit, as to extend vertically is formed in the protection portion. Moreover, below the conduit is the lower inflatable portion that is part of the protection portion, and the lower inflatable portion has the opening dimension in a vertical direction greater than that of the conduit. This configuration allows the airbag to secure a thickness at inflation in the vicinity of the conduit at least by the lower inflatable portion and thus the protection portion retains a sufficient cushioning property for receiving the occupant's head including the conduit and its vicinity.

It is desired in the above airbag that the partitioning portion that defines a boundary of the conduit includes an upper boundary portion that defines an upper boundary of the conduit and a lower boundary portion that defines a lower boundary of the conduit with the lower inflatable portion, that the inlet-side inflatable portion further includes an upper extending region that extends upward from the opposing region, and that the primary inflatable portion further includes an upper inflatable portion located above the conduit and partitioned from the conduit by the upper boundary portion. The upper inflatable portion should be communicated with the upper extending region so as to be inflatable generally simultaneously with the inlet-side inflatable portion and lower inflatable portion upon inflation of the primary inflatable portion and have an opening dimension in a vertical direction that is greater than that of the conduit over an entire area above the conduit.

With this configuration, upon inflation of the primary inflatable portion, the inlet-side inflatable portion located proximate the inlet port of the conduit, the upper inflatable portion and lower inflatable portion extending over the entire areas from the inlet port to the outlet port above and below the conduit complete inflation generally simultaneously. That is, the conduit is located, in a vertical direction, between the upper inflatable portion and lower inflatable portion that are inflated and have shape retention or rigidity, which helps the conduit to secure an opening dimension or open space through the whole passage from the inlet port to the outlet port in a stable manner. As a result, such behaviors of the conduit as bending that may cause an occlusion are securely prevented even when the lower periphery of the airbag moves upward on the rebound immediately after deployment of the primary inflatable portion.

Furthermore, since the upper inflatable portion has the opening dimension in a vertical direction that is greater than that of the conduit as well as the lower inflatable portion, it can secure a greater thickness than the conduit at airbag inflation. Therefore, even in the event that an occupant's head approaches the location of the conduit immediately after the deployment of the primary inflatable portion, the head is received by the upper and lower inflatable portions securely, thus the conduit is not occluded and smoothly feeds the inflation gas to the secondary inflatable portion.

An airbag for head protection may be provided with a gas feed passage that extends in an anteroposterior direction along an upper periphery of the airbag. In such an instance, if the conduit is located proximate an upper end of the secondary inflatable portion, a leading end region of the gas feed passage may act as the upper inflatable portion. If the conduit is located at an intermediate position in a vertical direction of the secondary inflatable portion, the upper inflatable portion should be communicated with the leading end region of the gas feed passage.

The airbag may include two of the protection portions located in front and at the rear of the secondary inflatable portion; a front protection portion and a rear protection portion. In that case, the conduit is desirably formed in such a manner as to project into either one of the protection portions and is located at the vicinity of a center of the airbag in an anteroposterior direction together with the secondary inflatable portion.

With this configuration, the secondary inflatable portion is located between the front protection portion adapted to protect an occupant seated in a front seat and the rear protection portion adapted to protect an occupant seated in a rear seat, i.e. in an area that is not intended to receive an occupant's head. This is an efficient arrangement of the secondary inflatable portion with respect to the whole airbag. Moreover, when the secondary inflatable portion and its vicinity located proximate the lower periphery of the airbag is going to cave in upward on the rebound immediately after deployment of the primary inflatable portion, the front protection portion and rear protection portion attempt to intrude into a lower side of the secondary inflatable portion and bend the secondary inflatable portion forcibly. However, since the inlet-side inflatable portion, the lower inflatable portion communicated therewith and possibly further the upper inflatable portion communicated with the inlet-side inflatable portion resist the bending of the conduit and therefore keep the conduit open.

It will also be appreciated that the front protection portion and the rear protection portion are so provided as to cover two windows of the vehicle located in front and rear of a pillar of the vehicle, and that the conduit is located between the front protection portion and the rear protection portion so as to be deployable on an interior of the pillar. Even with this configuration, the lower inflatable portion located below the conduit smoothly inflates together with the inlet-side inflatable portion deployable on the area of the window. That is, since the lower inflatable portion located below the conduit smoothly inflates although the conduit is arranged on the interior of the pillar that is positioned inward relative to the window, the conduit is allowed to deploy without an occlusion and lets out the inflation gas in the protection portion into the secondary inflatable portion smoothly and prevents a pressure increase of the protection portion.

In such an instance that the airbag includes two of the protection portions located in front and at the rear of the secondary inflatable portion, the lower inflatable portion may be formed to communicate the two protection portions.

If the length in an anteroposterior direction of the conduit is greater than the opening dimension in a vertical direction in a flattened and uninflated state of the airbag, an outflow of inflation gas from the protection portion to the secondary inflatable portion during the inflation of the primary inflatable portion is restrained, and thus expediting the deployment of the primary inflatable portion.

To consider the dimension of the conduit that can securely prevent an occlusion, the length in an anteroposterior direction of the conduit is desirably 30 to 120 mm whereas the opening dimension in a vertical direction of the conduit is desirably 30 to 60 mm. Furthermore, the opening dimension in a vertical direction of the lower inflatable portion is desirably 80 mm and above.

In order to restrain an outflow of inflation gas from the protection portion to the secondary inflatable portion during the inflation of the primary inflatable portion, it is desired that the conduit has a narrow portion on the way. Specifically, if the partitioning portion includes at a leading end at a side of the inlet port of the conduit a projecting portion that bulges inward of the conduit in a generally round shape and has a greater width than a portion immediately adjacent the leading end, the conduit has a reduced opening dimension at the inlet port relative to at an outlet port to the secondary inflatable portion due to the projecting portion. This configuration not only restrains an outflow of the inflation gas from the front protection portion to the secondary inflatable portion during the inflation of the primary inflatable portion, but also alleviates a stress concentration that acts on the inner panel and outer panel of the airbag in the vicinity of the projecting portion when the panels separate from each other in accordance with the inflation of the primary inflatable portion since the projecting portion has a generally round shape.

BRIEF DESCRIPTION OF DRAWINGS

FIG. 8A illustrates the airbag of the first embodiment at the rebound of a lower periphery of the airbag;

FIG. 8B illustrates the airbag of the first embodiment when receiving heads of occupants;

FIGS. 13A and 13B are partial enlarged horizontal sections illustrating in order a behavior of the secondary inflatable portion of the airbag of the second embodiment at inflation;

FIG. 14A illustrates the airbag of the second embodiment at the rebound of a lower periphery of the airbag;

FIG. 14B illustrates the airbag of the second embodiment when receiving heads of occupants;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
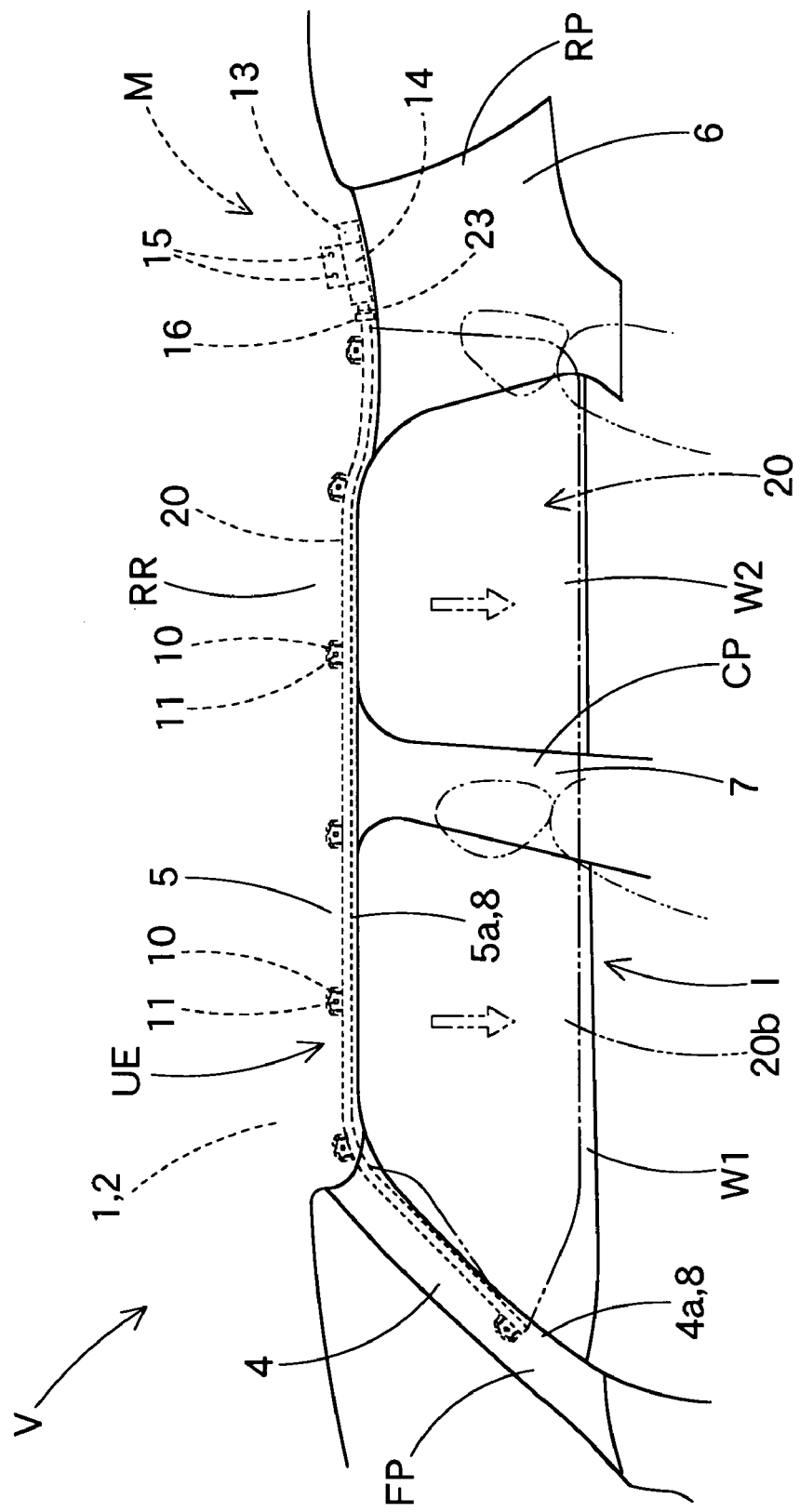
FIG. 1 is a schematic front view of an airbag apparatus employing a head-protecting airbag of the first embodiment of the invention as mounted on vehicle.

As shown in FIG. 1, a head-protecting airbag 20 according to a first embodiment of the present invention is used for a head-protecting airbag apparatus M. The airbag 20 is folded up and housed in upper peripheries UE of side windows W1 and W2 at sides of a front seat and rear seat inside a vehicle V for deployment downward to cover the side windows W1 and W2 when fed with inflation gas. The head-protecting airbag apparatus M includes an airbag 20, an inflator 13, mounting brackets 10, a bracket 14 and an airbag cover 8. The airbag 20 is folded up and housed in a range of the upper peripheries UE of the side windows W1 and W2 in an interior of vehicle V from a lower end region of a front pillar FP to an upper side of a rear pillar RP via a lower periphery of a roof side rail RR.

Referring to FIG. 1, the inflator 13 has a substantially columnar shape and is inserted into and coupled with a later-described joint port 23 of the airbag 20 for supplying inflation gas. A clamp 16 is used to couple the inflator 13 and the joint port 23. The inflator 13 is secured to an inner panel 2 at a position above the rear pillar RP by the bracket 14, and is covered by a lower periphery 5a of a roof head liner 5. The inner panel 2 is part of the vehicle body structure 1. The bracket 14 is made of sheet metal and is secured to the inner panel 2 by mounting bolts 15 while holding the inflator 13.

The mounting brackets 10 secure mounting portions 43 (FIG. 2) of the airbag 20 to the inner panel 2 by mounting bolts 11. The bolts 11 are fastened into unillustrated screw holes on the inner panel 2.

As shown in FIG. 1, the airbag cover 8 is comprised of a lower edge region 4a of a front pillar garnish 4 arranged on the front pillar FP and a lower edge region 5a of the roof head liner 5 arranged on the roof side rail RR. The front pillar garnish 4 and the roof head liner 5 are fabricated of synthetic resin and are respectively secured to an interior of the inner panel 2 at the front pillar FP and roof side rail RR. The roof head liner 5 is disposed from an upper side of the front pillar FP to the upper side of the rear pillar RP via an upper side of a center pillar CP. On an interior of each of the rear pillar RP and center pillar RP is a rear pillar garnish 6/a center pillar garnish 7 each of which is of synthetic resin.

As shown in FIGS. 1 and 8, when fed with inflation gas G from the inflator 13, the airbag 20 deploys downward from the upper peripheries UE of the side windows W1 and W2 and covers inner sides I of the windows W1 and W2, the center pillar garnish 7 of the center pillar CP and the rear pillar garnish 6 of the rear pillar RP. Referring to FIGS. 2 to 5, the airbag 20 includes a gas admissive portion 21 inflatable with inflation gas G by separating an inner panel 21a and an outer panel 21b and a non-admissive portion 41 that admits no inflation gas and keeps the inner panel 21a and outer panel 21b attached together. The airbag 20 has a hollow-weave or one-piece woven construction of polyamide yarn, polyester yarn or the like except a later-described mounting portion 43(F) located on the front end 20c. The mounting portion 43(F) is prepared separately as a cloth member woven by polyamide yarn, polyester yarn or the like and joined to the front end 20c of the airbag 20 by sewing or the like.

Figure 2:
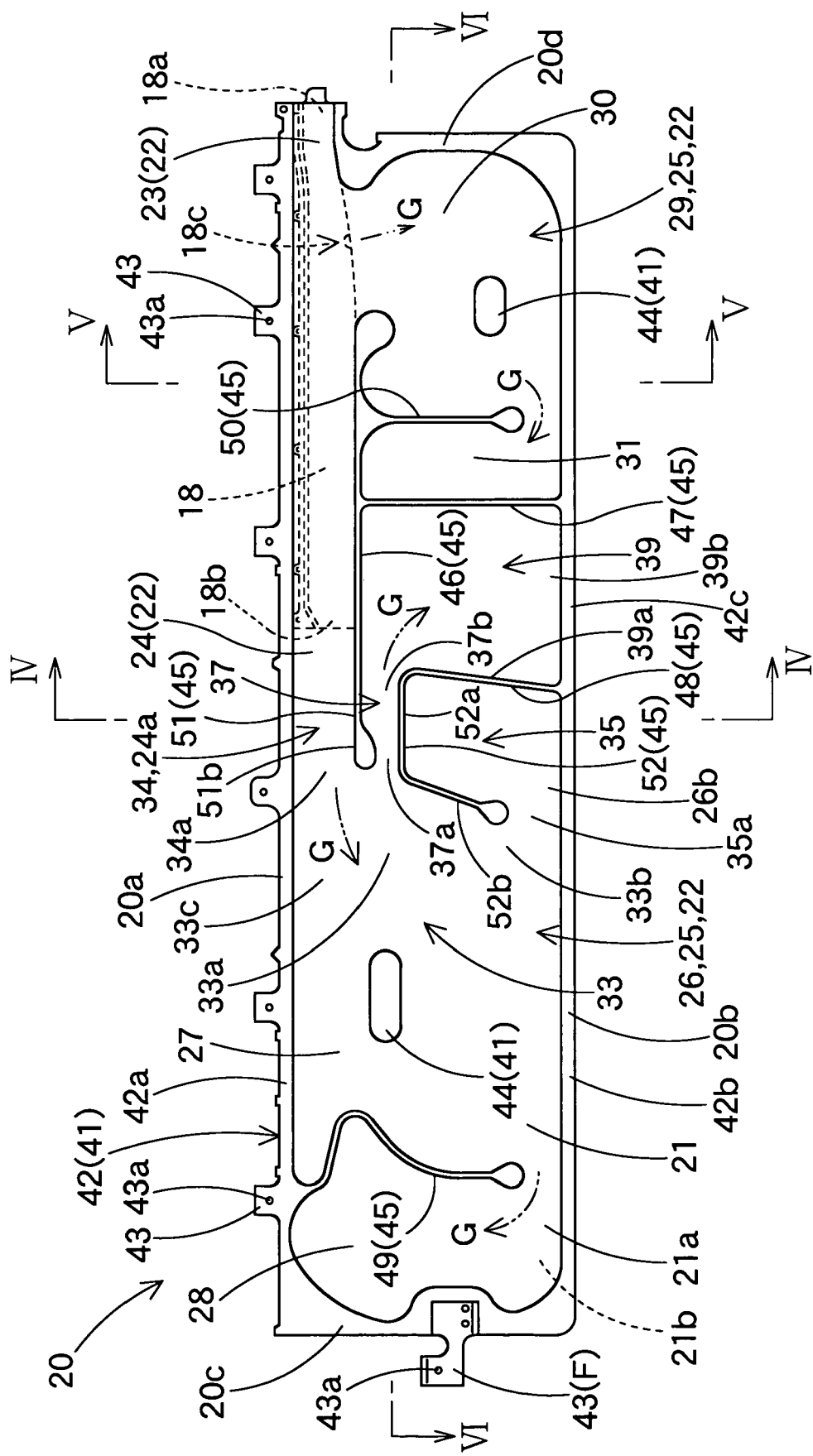
FIG. 2 is a front view of the airbag of the first embodiment as flattened.

As shown in FIGS. 2 and 8B, in the first embodiment, the airbag 20 includes a front protection portion 26 inflatable on interior sides of the front side window W1 and center pillar CP and a rear protection portion 29 inflatable on interior sides of the rear side window W2 (more particularly, a rear area of the side window W2) and the rear pillar RP.

The non-admissive portion 41 includes a peripheral portion 42, mounting portions 43, partitioning portions 44 and partitioning portions 45. The peripheral portion 42 is arranged around the gas admissive portion 21. The mounting portions 43 are formed in plurality to project upward from a top area 42a of the peripheral portion 42 at the upper periphery 20a of the airbag 20 or to project forward from the front end 20c of the airbag 20. Each of the mounting portions 43 includes an aperture 43a for receiving the mounting bolt 11. As described above, the mounting portions 43 are provided with the mounting brackets 10 and secured to the inner panel 2 by the mounting bolts 11 inserted into the apertures 43a and screwed into predetermined screw holes of the inner panel 2.

Each one partitioning portion 44 is formed on the front protection portion 26 and rear protection potion 29 as shown in FIG. 2. Each of the partitioning portions 44 is oval in shape as viewed from an interior of vehicle. The partitioning portions 44 are provided to regulate thicknesses of the front protection portion 26 and rear protection potion 29 such that the protection portions 26 and 29 inflate into plate-like shapes along the side windows W1 and W2 at airbag deployment. The partitioning portion 45 extends from the peripheral portion 42 in a linear fashion and includes a horizontal line portion 46, vertical line portions 47, 48, 49 and 50, an upper boundary portion 51 and a lower boundary portion 52. The partitioning portion 45 partitions the gas admissive portion 21 into a primary inflatable portion 22 and second inflatable portion 39, partitions the primary inflatable portion 22 into the joint port 23, a later-described gas feed passage 24 and a protection portion 25, and further forms a later-described conduit 37 inside the protection portion 25.

As best shown in FIG. 2, the vertical line portion 47 extends upward from the vicinity of the center 42c (more particularly, a position slightly rear of the center) in an anteroposterior direction of the bottom area 42b of the peripheral portion 42 in the lower periphery 20b of the airbag 20. The horizontal line portion 46 extends to the front and rear from an upper end of the vertical line portion 47 in a bifurcating matter at right angles with the vertical line portion 47. The vertical line portion 48 extends upward from the vicinity of the center 42c of the bottom area 42b of the peripheral portion 42 and in front of the vertical line portion 47.

The vertical line portion 49 extends downward from the top area 42a of the peripheral portion 42 at the front end 20c in the upper periphery 20a of the airbag 20. The vertical line portion 49 partitions the front protection portion 26 into a main area 27 having a big volume and a small cell 28 having a small volume in a communicating manner. The vertical line portion 50 extends downward from the vicinity of the rear end of the horizontal line portion 46. The vertical line portion 50 partitions the rear protection portion 29 into a main area 30 having a big volume and a small cell 31 having a small volume in a communicating manner. The vertical line portions 49 and 50 serve to prevent a pressure increase in the main areas 27 and 30 before the inflation of a later-described secondary inflatable portion 39 by letting out inflation gas G into the small cells 28 and 31 as well as limit the thicknesses of the front protection portion 26 and rear protection portion 29 at full inflation of the airbag.

Figure 3:
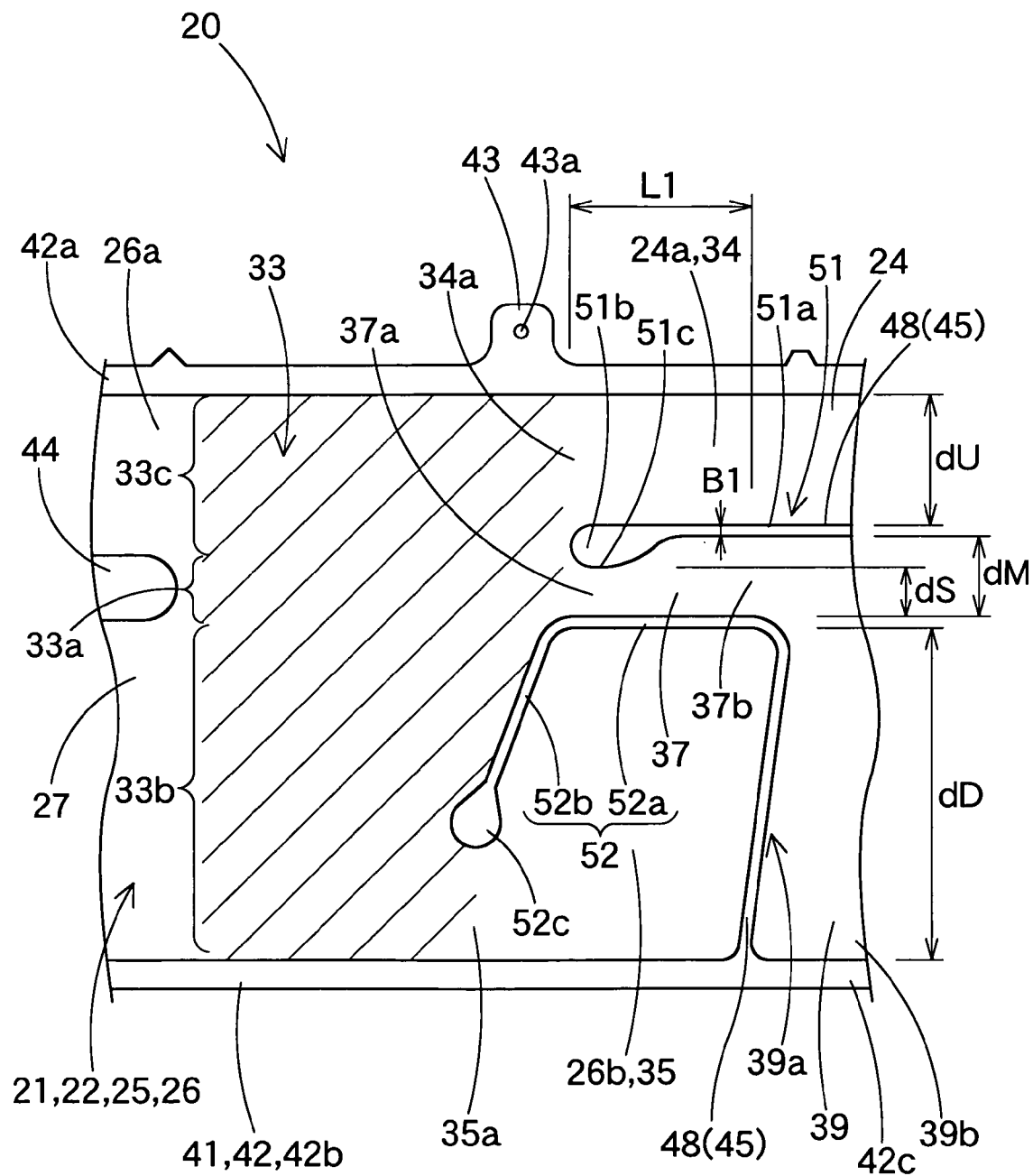
FIG. 3 is an enlarged front view of the airbag of FIG. 2 showing the vicinity of a conduit.

Referring to FIG. 3, the upper boundary portion 51, which concurrently acts as the front end of the horizontal line portion 46, defines the upper boundary of the conduit 37. The lower boundary portion 52 includes a main portion 52a that extends forward along an anteroposterior direction from the upper end of the vertical line portion 48 and an extension portion 52b extending slightly obliquely downward and forward from the front end of the main portion 52a and thus has an inverse-L shape. The main portion 52a defines the lower boundary of the conduit 37 whereas the extension portion 52b partitions a later-described inlet-side inflatable portion 33 and a later-described lower inflatable area 35. The extension portion 52b extends generally in parallel to the vertical line portion 48 that acts as the front edge 39a of the secondary inflatable portion 39.

Figure 6:
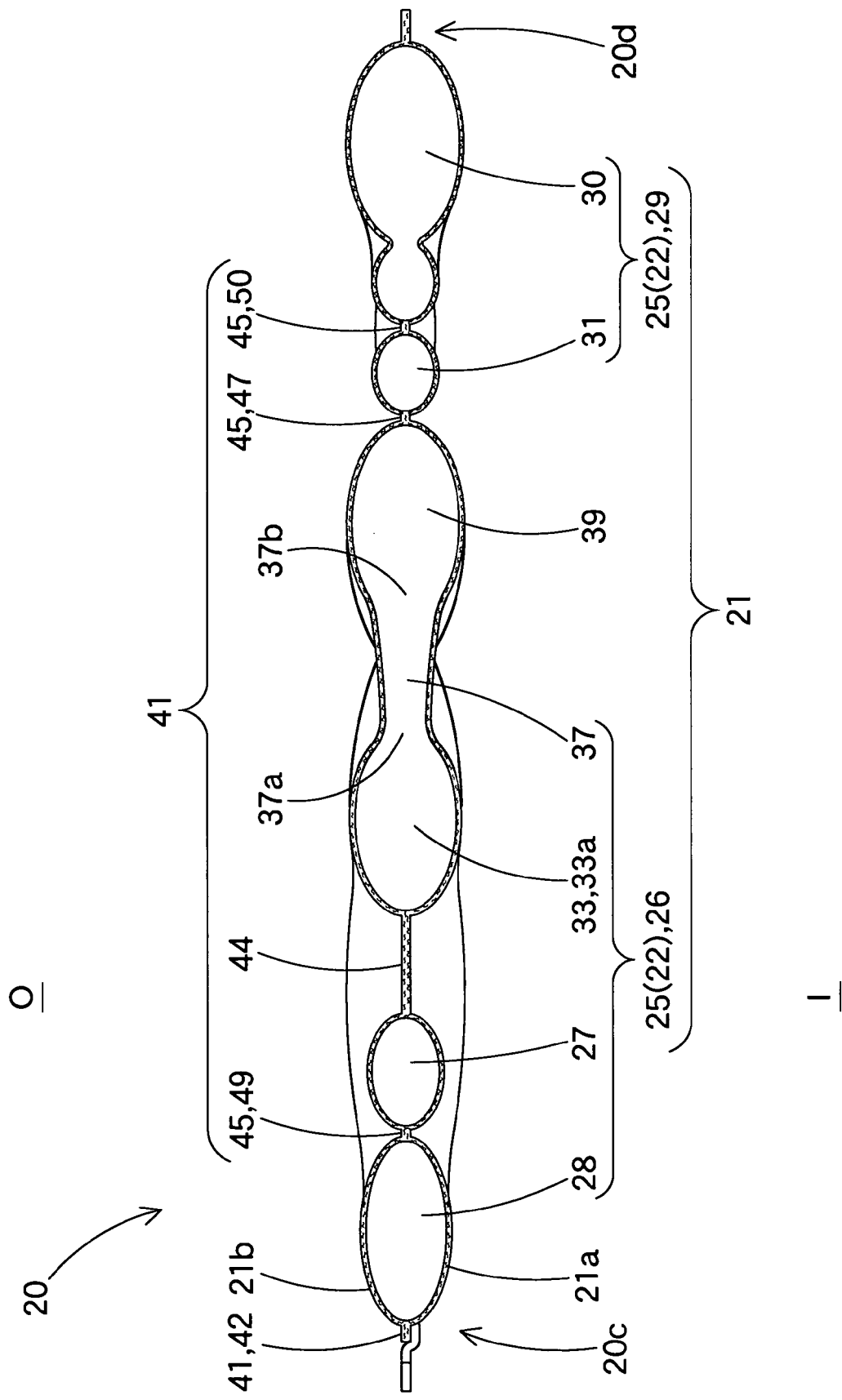
FIG. 6 is a horizontal section taken along line VI-VI of FIG. 2 at full deployment of the airbag including a secondary inflatable portion.

Referring to FIGS. 2 and 6, in the first embodiment, the gas admissive portion 21 includes a primary inflatable portion 22 inflatable in an early stage of airbag deployment for receiving an occupant's head and a secondary inflatable portion 39 that is in gas communication with the primary inflatable portion 22 and admits inflation gas G from the primary inflatable portion 22 for restraining a pressure increase of the primary inflatable portion 22.

The primary inflatable portion 22 includes a joint port 23, a gas feed passage 24, a protection portion 25 and a conduit 37. The protection portion 25 includes a front protection portion 26 and a rear protection portion 29 for respectively protecting an occupant seated in the front seat/the rear seat. Specifically, the front protection portion 26 is deployable on interior sides of the front side window W1 and center pillar CP whereas the rear protection portion 29 is deployable on interior sides of the rear side window W2 and the rear pillar RP as shown in FIG. 8B.

As shown in FIG. 2, the gas feed passage 24 is arranged straightly in an anteroposterior direction of the vehicle V along the upper periphery 20a of the airbag 20 and extends above the horizontal portion 46 in such a manner as to communicate the front protection portion 26 and the rear protection portion 29.

Figure 5:
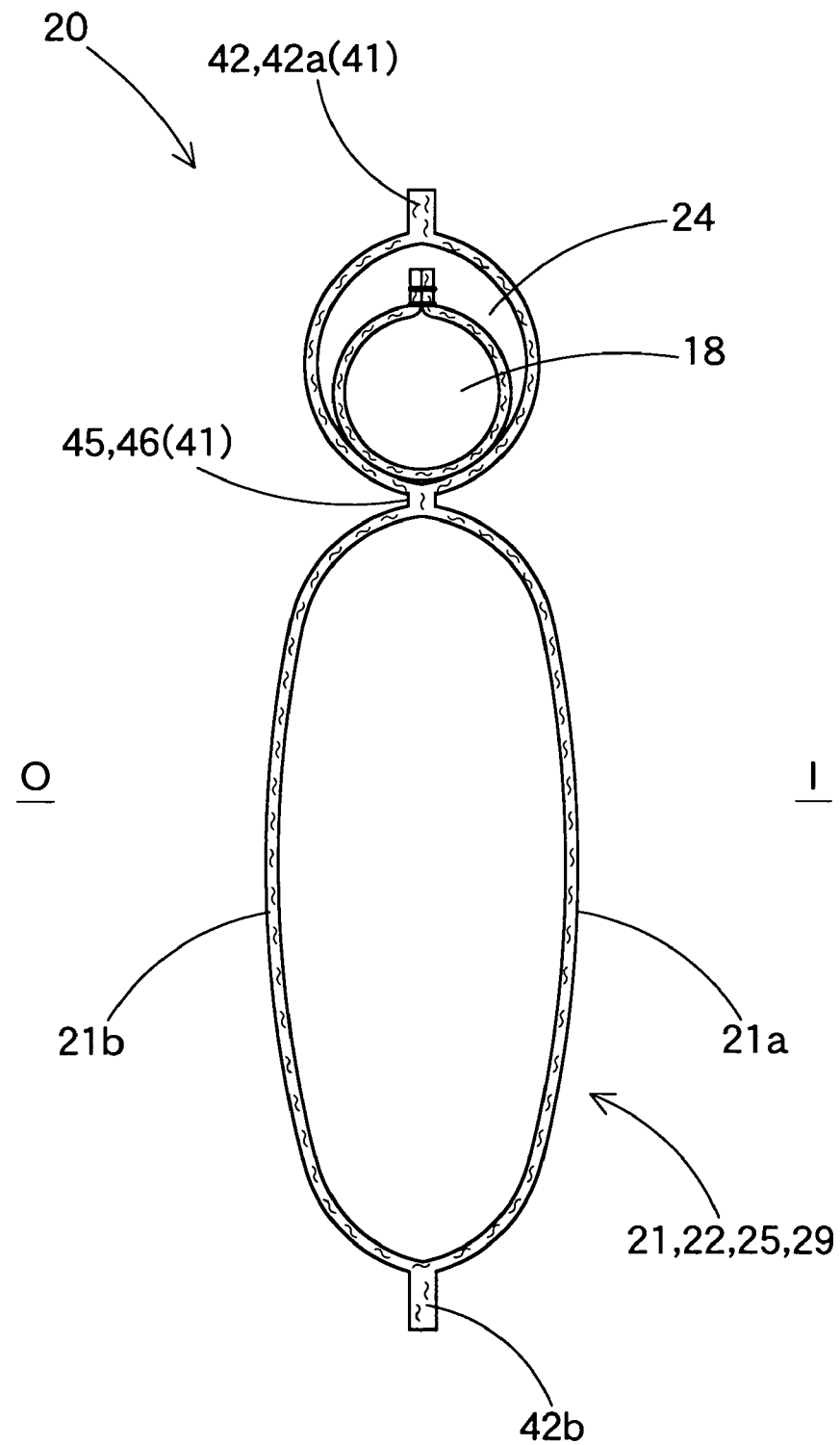
FIG. 5 is a vertical section taken along line V-V of FIG. 2 at full deployment of the primary inflatable portion.

Referring to FIG. 2, the joint port 23 is so located as to project rearward from the rear end 20d of the upper periphery 20a of the airbag 20 for connection with the inflator 13 and admitting inflation gas G from the inflator 13. Inside the joint port 23 is a cylindrical inner tube 18 (FIGS. 2 and 5). The inner tune 18 includes at the rear end an inset port 18a for receiving the inflator 13. The inflator 13 is inserted into the inset port 18a of the inner tube 18 placed inside the joint port 23 and fastened with the clamp 16, thus connected with the joint port 23. The inner tube 18 includes at the front end a first outlet 18b for feeding inflation gas G from the inflator 13 and gas feed passage 24 to the front protection potion 26, and a second outlet 18c that feeds gas G to the rear protection portion 29 at the underside above the main body 30 of the rear protection portion 29 and at the rear of the rear end of the horizontal line portion 46. In this specific embodiment, the first outlet 18b is located at the rear of the front end 51b of the horizontal line portion 46, i.e. at the rear of the front end or leading end of the upper boundary portion 51.

The secondary inflatable portion 39 is located below the gas feed passage 24 at a vicinity of the center in an anteroposterior direction of the airbag 20 and between the front protection portion 26 and rear protection portion 29. The secondary inflatable portion 39 of the first embodiment is a generally rectangular area defined by the horizontal line portion 46, vertical line portions 47, 48, and the central region 42c of the bottom area 42b of the peripheral portion 42 in the lower periphery 20b of the airbag 20.

The conduit 37 that communicates the primary inflatable portion 22 and the secondary inflatable portion 39 extends in an anteroposterior direction of the airbag 20 from an inlet port 37a at a side of the protection portion 25 to an outlet port 37b to the secondary inflatable portion 39. The conduit 37 is located at a vicinity of the center in an anteroposterior direction of the airbag 20 as well as the secondary inflatable portion 39. In the first embodiment, the conduit 37 is located immediately below the front end region 24a of the gas feed passage 24 and away from the lower periphery 20b of the airbag 20. The inlet port 37a located at the front end of the conduit 37 is formed in such a manner as to project into the front protection potion 26 whereas the outlet port 37b is located at the top of the front end 39a of the secondary inflatable portion 39.

Around the conduit 37 are an inlet-side inflatable portion 33, an upper inflatable portion 34 and a lower inflatable portion 35. As indicated by a shaded area in FIG. 3, the inlet-side inflatable portion 33 is formed in gas communication with the inlet port 37a of the conduit 37 in front of the conduit 37 in such a manner as to extend downward from a vicinity of the gas feed passage 24 in a top area 26a of the front protection portion 26. The upper inflatable portion 34 is located above the conduit 37, partitioned from the conduit 37 by the upper boundary portion 51 or the front end region of the horizontal line 46. That is, the upper inflatable portion 34 is comprised of the front end region 24a of the feed passage 24. The lower inflatable portion 35 is located below the conduit 37, partitioned from the conduit 37 by the main portion 52a of the lower boundary portion 52. The lower inflatable portion 35 is comprised of a rear end region 26b of the front protection portion 26. The upper inflatable portion 34 and lower inflatable portion 35 are on the opposite sides of the conduit 37 in a vertical direction.

The upper inflatable portion 34, the lower inflatable portion 35 and the inlet-side inflatable portion 33 formed around the conduit 37 are designed inflatable generally simultaneously at the inflation of the primary inflatable portion 22. That is, the upper inflatable portion 34 and the lower inflatable portion 35 are communicated with each other via the inlet-side inflatable portion 33.

Referring to FIG. 3, the inlet-side inflatable portion 33 includes an opposing region 33a that is adjacent the inlet port 37a in front of the inlet port 37a, an upper extending region 33c that is located above the opposing region 33a and extends up to the top area 42a of the peripheral portion 42 in the upper periphery 20a of the airbag 20 and a lower extending region 33d that is located below the opposing region 33a and extends up to the bottom area 42b of the peripheral portion 42 in the lower periphery 20b of the airbag 20. In other words, the upper extending region 33c is a region of the front protection portion 26 that is adjacent the front end region 24a of the gas feed passage 24. The lower extending region 33d is a region proximate and in front of the extension portion 52b of the lower boundary portion 52. Thus, the upper inflatable portion 34 is communicated with the upper extending region 33c of the inlet-side inflatable portion 33 via a communication port 34a provided at the front end and the conduit 37 is communicated with the opposing region 33a of the inlet-side inflatable portion 33 via the inlet port 37a at the front end. Further, the lower inflatable portion 35 is communicated with the lower extending region 33b of the inlet-side inflatable portion 33 via a communication port 35a formed at the lower front end and between a lower end 52c of the extension portion 52b of the lower boundary portion 52 and the peripheral portion 42 in the lower periphery 20b of the airbag 20.

In the first embodiment, the conduit 37, together with the upper inflatable portion 34 and the lower inflatable portion 35 are designed deployable on an interior of the center pillar CP as shown in FIG. 8B.

In order that the inflation gas G of the primary inflatable portion 22 is fed to the secondary inflatable portion 39 after the primary inflatable portion 22 completes inflation, not immediately, the conduit 37 has a predetermined length L1 (FIG. 3) and a restrained opening area in a direction orthogonal to the axial direction from the inlet port 37a to the outlet port 37b. Especially in the first embodiment, the anteroposterior length L1 in a flattened and uninflated state of the airbag 20 is designed greater than a maximum opening dimension dM in a vertical direction of the conduit 37 as shown in FIG. 3. In the illustrated embodiment, the maximum opening dimension dM is that of the outlet port 37b.

Moreover, in the first embodiment, the upper boundary portion 51 includes at the front end or leading end 51b at a side of the inlet port 37a a projecting portion 51c that bulges inward of the conduit 37 in a generally round shape and has a greater width than a general portion 51a which immediately adjoins the leading end 51b, and due to this projecting portion 51c, the conduit 37 has a reduced opening area at the inlet port 37a than at the outlet port 37b. That is, as shown in FIG. 3, the opening dimension dS in a vertical direction at the inlet port 37a is smaller than the maximum opening dimension dM in a vertical direction at the outlet port 37b.

Furthermore, the opening dimension dD in a vertical direction of the lower inflatable portion 35 is designed greater than the opening dimension dM in a vertical direction of the conduit 37 over an entire area below the conduit 37 in order that the lower inflatable portion 35 retains its shape and does not cause an occlusion of the conduit 37 when the lower periphery 20b of the airbag 20 moves upward on the rebound of deployment immediately after the completion of deployment of the primary inflatable potion 22. Likewise, the opening dimension dU in a vertical direction of the upper inflatable portion 34 is designed greater than the opening dimension dM in a vertical direction of the conduit 37 over an entire area above the conduit 37. The dimensions dD and dU are measured in a flattened and uninflated state of the airbag 20 as well as the dimension dM of the conduit 37.

The airbag 20 is manufactured by hollow-weaving and connecting the mounting portion 43(F) to the front end 20c of the airbag 20. Then the inner tube 18 is inserted into the joint port 23 for connection with the inflator 13. Before mounting on the vehicle, the airbag 20 is folded up in such a manner as to bring the lower periphery 20b close to the upper periphery 20a where the mounting portions 43 are formed and then an unillustrated breakable wrapping member is mounted around the folded-up airbag 20 for keeping the folded-up configuration. Subsequently, the inflator 13 equipped with the bracket 14 for mounting is coupled to the joint port 23 with the inner tube 18 of the airbag 20 by the clamp 16. An airbag module is completed by attaching the mounting brackets 10 to the mounting portions 43 of the airbag 20.

The airbag module thus manufactured is mounted on the vehicle body 1 by locating the brackets 10 and 14 on predetermined locations on the inner panel 2 of the vehicle body 1 and fastening the brackets thereto by mounting bolts 11 and 15. Then an unillustrated lead wire extending from a suitable control for actuating the inflator is connected to the inflator 13. If then the front pillar garnish 4, the roof head liner 5, the rear pillar garnishes 6 and the center pillar garnish 7 are attached to the vehicle body 1, the airbag apparatus M is mounted on the vehicle V.

When the inflator 13 is actuated after the airbag apparatus M is mounted on the vehicle V, the inflation gas G discharged from the inflator 13 flows into the inner tube 18 from the joint port 23 and flows out of the outlets 18b and 18c as indicated by double-dashed lines in FIG. 2. The gas G flowing out of the outlet 18b flows into the front protection portion 26 via the front end region 24a of the gas feed passage 24 whereas the gas G flowing out of the outlet 18c flows into the rear protection portion 29, thereby inflating the protection portions 26 and 29. Then the wrapping member gets broken and the airbag cover 8 constructed of the lower edges 4a and 5a of the front pillar garnish 4 and roof head liner 5 is pushed and opened, and the protection portions 26 and 29 deploy downward and cover the interiors I of the side windows W1 and W2, the center pillar CP and the rear pillar RP as indicated by double-dashed lines in FIG. 1.

In operation of the airbag 20 according to the first embodiment of the invention, the protection portion 25, i.e. the front protection portion 26 and rear protection portion 29 complete deployment firstly to cover the interiors I of the side windows W1 and W2, the center pillar CP and the rear pillar RP. At this time, in an area extending downward from the inlet port 37a of the conduit 37, the inlet-side inflatable potion 33 and the lower inflatable portion 35 inflate in a generally L shape in such a manner as to surround the conduit from underside. The opening dimension dD in a vertical direction of the lower inflatable portion 35 is designed greater than the opening dimension dM in a vertical direction of the conduit 37 over an entire area below the conduit 37 such that the lower inflatable portion 35 retains its shape and does not cause an occlusion of the conduit 37 when the lower periphery 20b of the airbag 20 moves upward on the rebound of deployment immediately after the completion of deployment of the primary inflatable potion 22.

Accordingly, even in the event that the lower periphery 20b of the airbag 20 moves upward as a reaction to a downward deployment of the primary inflatable portion 22 while the secondary inflatable portion 39 is not yet inflated, the L-shaped inflated region in the area extending downward from the inlet port 37a of the conduit 37 as shown in FIG. 8A, which is comprised of the inlet-side inflatable portion 33 and lower inflatable portion 35, resists the rebound and prevents the conduit 37 from collapsing or bending to occlusion, thus securing a communication from the inlet port 37a to the outlet port 37b.

Figure 7A:
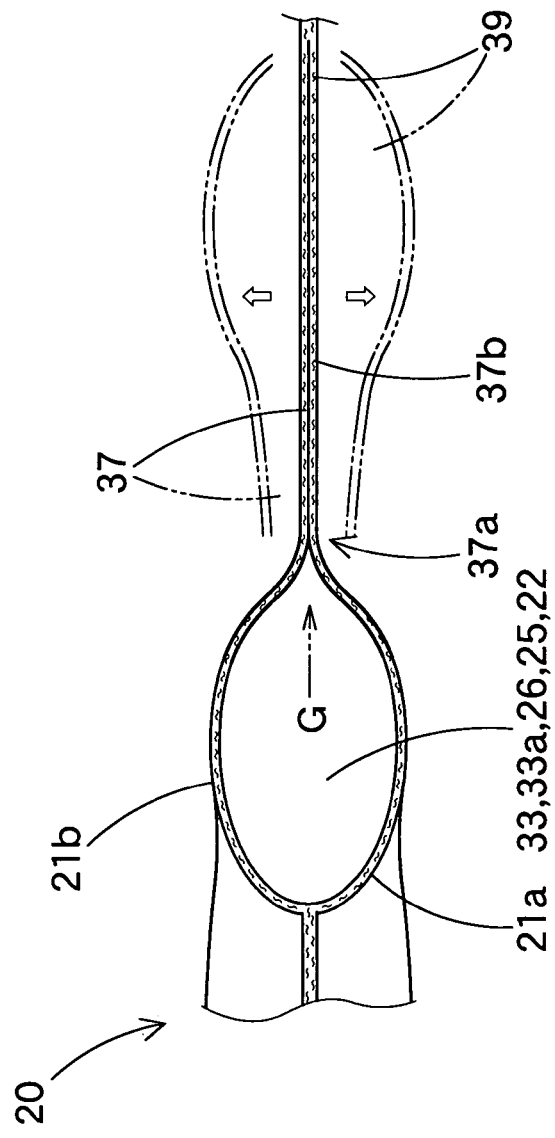
FIGS. 7A and 7B are partial enlarged horizontal sections illustrating in order a behavior of the secondary inflatable portion of the airbag at inflation.
Figure 7B:
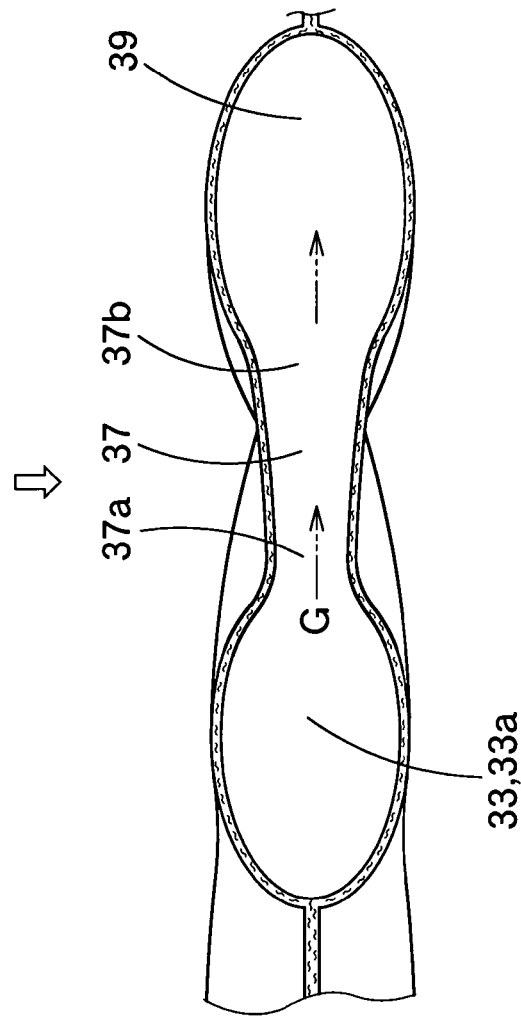
Figure 9:
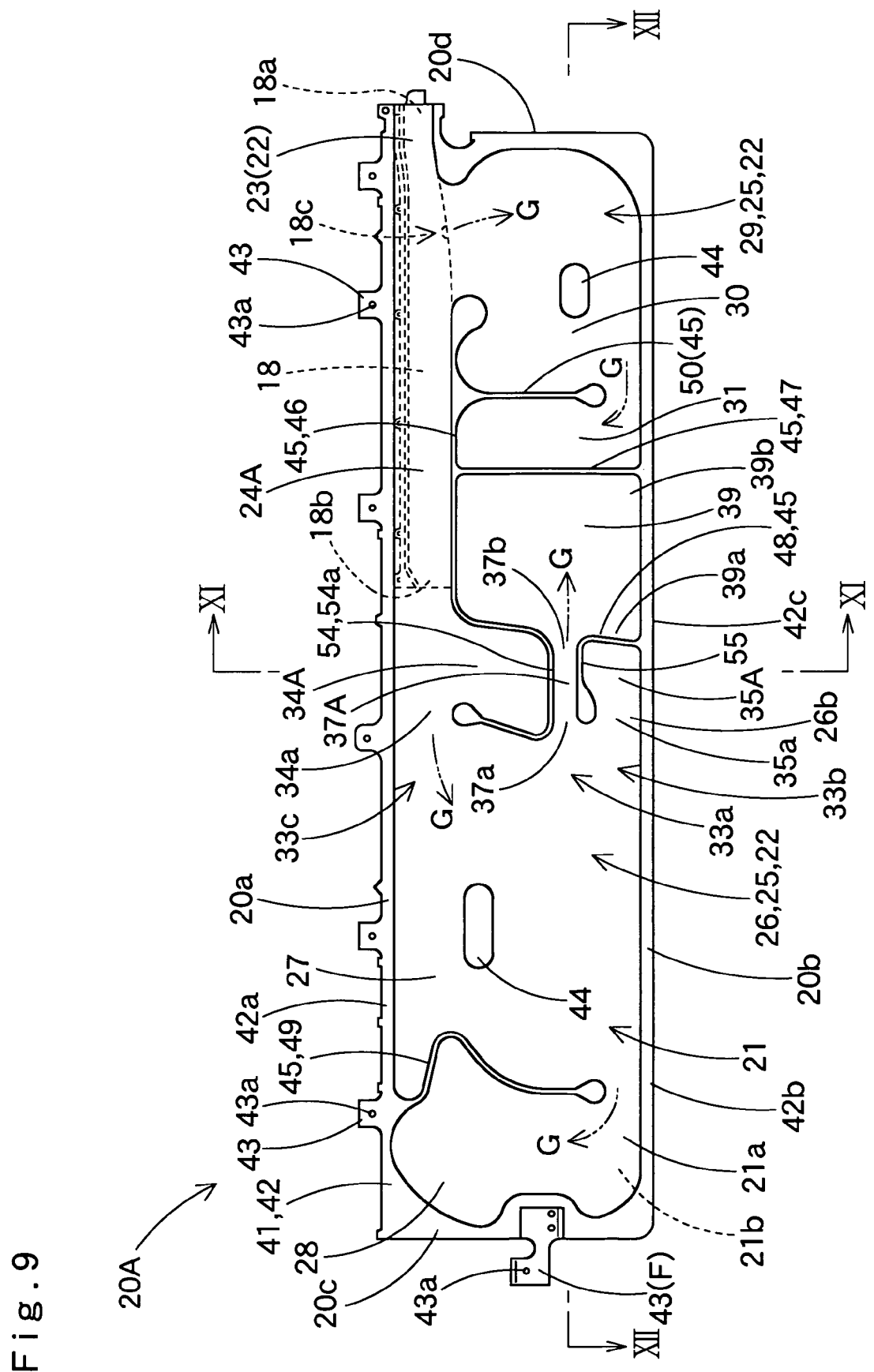
FIG. 9 is a front view of an airbag of the second embodiment as flattened.

Thereafter, when the protection portion 25, for example the front protection portion 26 receives an occupant's head H and an inner pressure of the protection portion 26 is going to rise, the inflation gas G inside the protection portion 26 smoothly flows into the secondary inflatable portion 39 via an unoccluded, open passage of the conduit 37 as shown in FIGS. 7, 8A and 8B, thus restraining a pressure increase of the protection portion 26 in a stable manner.

Therefore, the airbag 20 of the first embodiment of the invention can prevent an occlusion of the conduit 37 and an increase of internal pressure of the protection portion 25 that may be caused by the occlusion right after the completion of inflation of the primary inflatable portion 22 in a steady fashion.

Figure 4:
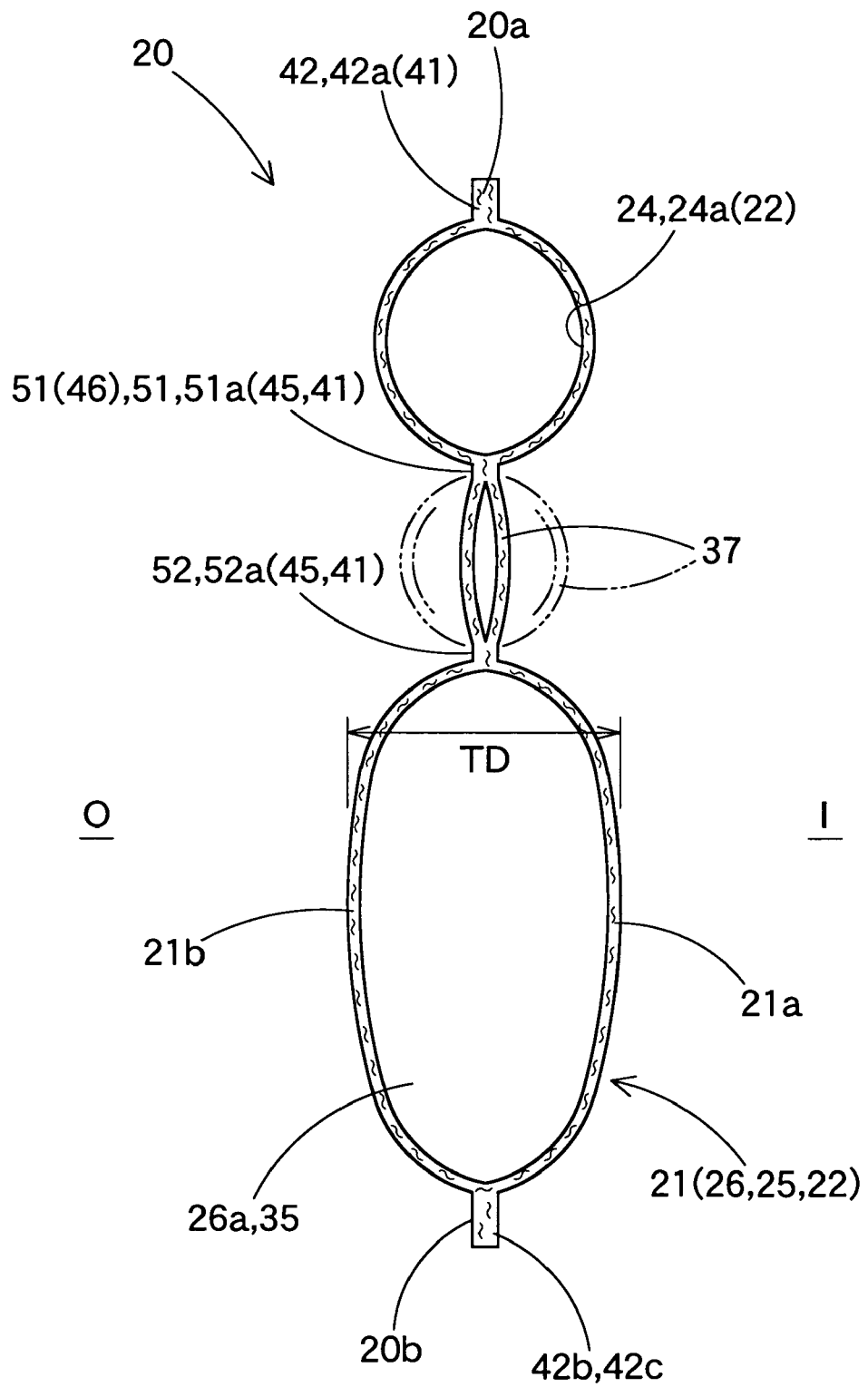
FIG. 4 is a vertical section taken along line IV-IV of FIG. 2 at full deployment of a primary inflatable portion.

In the first embodiment, the conduit 37 is formed in such a manner as to intrude into the front protection portion 26, not the secondary inflatable portion 39. Nevertheless, this configuration does not inhibit a cushioning property of the front protection portion 26 because the conduit 37 is formed such that its axial direction extends in an anteroposterior direction from the inlet port 37a from the front protection portion 26 to the outlet port 37b to the secondary inflatable portion 39, and therefore it is not that such a continuous thin area, of the conduit, as to extend vertically is formed in the front protection portion 26. Moreover, below the conduit 37 is the lower inflatable portion 35 that is part of the front protection portion 26, and the lower inflatable portion 35 has the opening dimension dD in a vertical direction greater than the opening dimension dM in a vertical direction of the conduit 37. This configuration allows the airbag 20 to secure a thickness TD at inflation as shown in FIG. 4 in the vicinity of the conduit 37 at least by the lower inflatable portion 35 and thus the front protection portion 26 retains a sufficient cushioning property for receiving the occupant's head H including the conduit 37 and its vicinity.

In the first embodiment, moreover, the partitioning portion that defines the boundary of the conduit 37 includes the upper boundary portion 51 that defines the upper boundary of the conduit 37 and the lower boundary portion 52 that defines the lower boundary of the conduit 37. The inlet-side inflatable portion 33 includes the upper extending region 33c that extends upward from the opposing region 33a. The protection portion 25 includes the upper inflatable portion 34 located above the conduit 37, partitioned from the conduit 37 by the upper boundary portion 51, and the upper inflatable portion 34 is communicated with the upper extending region 33c so as to be inflatable generally simultaneously with the inlet-side inflatable portion 33 and lower inflatable portion 35 upon inflation of the primary inflatable portion 22 and has the opening dimension dU in a vertical direction that is greater the opening dimension dM in a vertical direction of the conduit 37 over an entire area above the conduit 37.

With this configuration, upon inflation of the primary inflatable portion 22, the inlet-side inflatable portion 33 located in front of the inlet port 37a of the conduit 37, the upper inflatable portion 34 and lower inflatable portion 35 extending over the entire areas from the inlet port 37a to the outlet port 37b above and below the conduit 37 complete inflation generally simultaneously. That is, the conduit 37 is located, in a vertical direction, between the upper inflatable portion 34 and lower inflatable portion 35 that are inflated and have shape retention or rigidity, which helps the conduit 37 to secure an opening dimension or open space through a whole passage from the inlet port 37a to the outlet port 37b in a stable manner. As a result, such behaviors as bending of the conduit 37 that may cause an occlusion are securely prevented even when the lower periphery 20b of the airbag 20 moves upward on the rebound immediately after deployment of the primary inflatable portion 22. Especially, in such an airbag 20 of the first embodiment that the lower end 39b of the secondary inflatable portion 39 is continuous with the bottom area 42b of the peripheral portion 42 in the lower periphery 20b of the airbag 20, the secondary inflatable portion 39 is more likely to cave in upward together with the bottom area 42b of the peripheral portion 42 at the rebound. However, the configuration described above prevents the conduit 37 from bending in a secure manner.

In the first embodiment, moreover, the protection portion 25 includes the front protection portion 25 located in front of the secondary inflatable portion 39 and the rear protection portion 29 located at the rear of the secondary inflatable portion 39. The conduit 37 is formed in such a manner as to project into the front protection portion 26 (though it may also be formed to project into the rear protection portion 29) and located at a vicinity of a center of the airbag 20 in an anteroposterior direction together with the secondary inflatable portion 39.

With this configuration, the secondary inflatable portion 39 is located between the front protection portion 26 adapted to protect an occupant seated in a front seat and the rear protection portion 29 adapted to protect an occupant seated in a rear seat, i.e. in an area that is proximate a front end of the side window W2 where an occupant's head H is not supposed to be located and that is not intended to receive the head H. This is an efficient arrangement of the secondary inflatable portion 39 in the whole airbag 20. With this configuration, moreover, when the bottom area 39b of the secondary inflatable portion 39 and its vicinity in the lower periphery 20b of the airbag 20 is going to cave in upward on the rebound immediately after deployment of the primary inflatable portion 22, the front protection portion 26 and rear protection portion 29 attempt to intrude into a lower side of the secondary inflatable portion 39 and bend the secondary inflatable portion 39 forcibly. In the configuration of the first embodiment, however, since the inlet-side inflatable portion 33, the lower inflatable portion 35 communicated with the inflatable portion 33 and possibly further the upper inflatable portion 34 communicated with the inflatable portion 33 resist the bending of the conduit 37 and therefore keep the conduit 37 open.

Furthermore, in the first embodiment, the front protection portion 26 and the rear protection portion 29 are designed to cover interiors I of the side windows W1 and W2 located in front and rear of the center pillar PC of the vehicle V so the conduit 37 is deployable on the interior I of the center pillar CP. Even with this configuration, the lower inflatable portion 35 smoothly inflates together with the inlet-side inflatable portion 33 deployable on the area of the side window W1. That is, since the lower inflatable portion 35 located below the conduit 37 smoothly inflates although the conduit 37 is arranged on the interior I of the center pillar CP that is positioned inward relative to the side window W1, the conduit 37 is allowed to deploy without an occlusion and lets out the inflation gas G in the front protection portion 26 into the secondary inflatable portion 39 smoothly and prevents a pressure increase of the front protection portion 26.

In the first embodiment, the length L1 in an anteroposterior direction of the conduit 37 is greater than the opening dimension dM in a vertical direction in a flattened and uninflated state of the airbag 20. This configuration helps restrain an outflow of the inflation gas G from the front protection portion 26 to the secondary inflatable portion 39 during the inflation of the primary inflatable portion 22, and thus expediting the deployment of the primary inflatable portion 22.

Furthermore, in the first embodiment, the conduit 37 has a narrow portion where the opening dimension is a minimum value dS in the course from the inlet port 37a to the outlet port 37b. This configuration restrains an outflow of the inflation gas G from the front protection portion 26 during the inflation of the primary inflatable portion 22 as well. Especially in the first embodiment, the upper boundary portion 51 of the partitioning portion 45 includes at the leading end 51a at a side of the inlet port 37a of the conduit 37 the projecting portion 51c that bulges inward of the conduit 37 in a generally round shape and has a greater width than a width B1 (FIG. 3) of a general portion 51a which immediately adjoins the leading end 51b, and the conduit 37 has the reduced opening dimension dS at the inlet port 37a relative to the opening dimension dM at the outlet port 37b due to the projecting portion 51c. This configuration not only restrains an outflow of the inflation gas G from the front protection portion 26 during the inflation of the primary inflatable portion 22 but also alleviates a stress concentration that acts on the inner panel 21a and outer panel 21b of the airbag 20 in the vicinity of the projecting portion 51c when the panels 21a and 21b separate from each other in accordance with the inflation of the primary inflatable portion 22 since the projecting portion 51c has a generally round shape.

Although the upper inflatable portion 34 located above the conduit 37 and communicated with the inlet-side inflatable portion 33 is comprised of the front end region 24a of the gas feed passage 24 in the first embodiment, it may also be configured as an airbag 20A of the second embodiment shown in FIGS. 9 to 13B.

Figure 10:
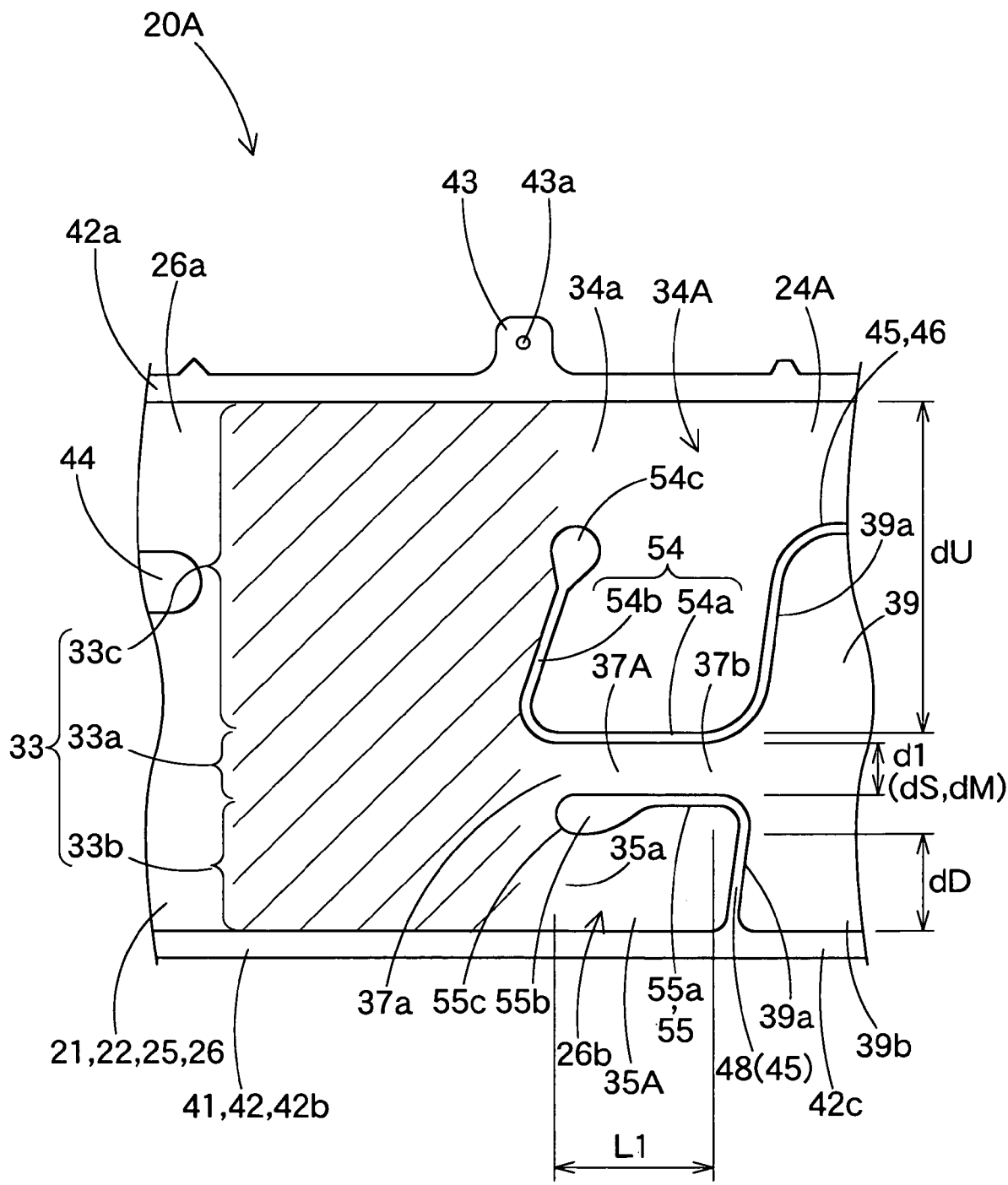
FIG. 10 is an enlarged front view of the airbag of FIG. 9 showing the vicinity of a conduit.

As shown in FIG. 10, in the airbag 20A, an outlet port 37b of a conduit 37A to the secondary inflatable portion 39 is located at an intermediate position in a vertical direction of a front end 39a of the secondary inflatable portion 39. The upper boundary portion 54 that defines an upper boundary of the conduit 37A includes a main portion 54a that extends forward along an anteroposterior direction from the front end 39a and an extension portion 54b that extends slightly obliquely rearward and upward from the vicinity of an inlet port 37a of the conduit 37A generally in parallel to the front end 39a and has a generally round, bulging upper end 54c. The lower boundary portion 55 that defines a lower boundary of the conduit 37A extends linearly forward from the front end 39a of the secondary inflatable portion 39 and includes at the leading end 55b a projecting portion 55c that projects downward in a generally round shape to be wider than a general portion 55a which immediately adjoins the leading end 55b.

The upper inflatable portion 34A of the second embodiment extends forward and downward from a gas feed passage 24A and is communicated with the upper extending region 33c of the inlet-side inflatable portion 33 (indicated by a shaded are in FIG. 10) that extends upward from an opposing portion 33a via a communication port 34a formed between the upper end 54c of the extension portion 54b of the upper boundary portion 54 and the top area 42a of the peripheral portion 42.

The lower inflatable portion 35A is defined by a vertical line portion 48 or the front end 39a of the secondary inflatable portion 39, the lower boundary portion 55 extending forward from the vertical line portion 48 and a central region 42c in an anteroposterior direction of the bottom area 42b of the peripheral portion 42 in the lower periphery 20b of the airbag 20, and is communicated with the lower extending region 33b of the inlet-side inflatable portion 33 via the communication port 35a located at the front end.

Since the inlet-side inflatable portion 33, the upper inflatable portion 34A and the lower inflatable portion 35A are communicated with one another in a continuous manner via the communication ports 34a and 35a, these inflatable portions 33, 34A and 35A are inflatable generally simultaneously at the inflation of the primary inflatable portion 22.

In order that the inflation gas G of the primary inflatable portion 22 is fed to the secondary inflatable portion 39 after the primary inflatable portion 22 completes inflation, not immediately, the conduit 37A has a predetermined length L1 (FIG. 10) and a restrained opening area in a direction orthogonal to the axial direction from the inlet port 37a to the outlet port 37b. Specifically, in the second embodiment as well, the length L1 in an anteroposterior direction of the conduit 37A is greater than an opening dimension d1 in a vertical direction in a flattened and uninflated state of the airbag 20A as shown in FIG. 10. In this specific embodiment, the opening dimension d1 is configured generally uniform from the inlet port 37a to the outlet port 37b (d1=dM=dS).

As to the lower inflatable portion 35A, the opening dimension dD in a vertical direction of the lower inflatable portion 35A, which, in the illustrated embodiment, refers to a minimum dimension measured at the location of the projecting portion 55c, is designed greater than the opening dimension d1 in a vertical direction of the conduit 37A over an entire area below the conduit 37A in order that the lower inflatable portion 35A retains its shape and does not cause an occlusion of the conduit 37A when the lower periphery 20b of the airbag 20 moves upward on the rebound of deployment immediately after the completion of deployment of the primary inflatable potion 22. Likewise, the opening dimension dU in a vertical direction of the upper inflatable portion 34A is designed greater than the opening dimension d1 in a vertical direction of the conduit 37A over an entire area above the conduit 37A. The dimensions dD and dU are measured in a flattened and uninflated state of the airbag 20A as well as in the first embodiment.

The airbag 20A of the second embodiment is mounted on a vehicle in a manner similar to the first embodiment. Upon airbag deployment, since the inlet-side inflatable portion 33, the upper inflatable portion 34A and lower inflatable portion 35A surround the conduit 37A, the conduit 37A is not occluded and smoothly feed the inflation gas G from the front protection portion 26 to the secondary inflatable portion 39 as shown in FIGS. 13A to 14B, thus obtaining the same results as in the first embodiment.

Figure 11:
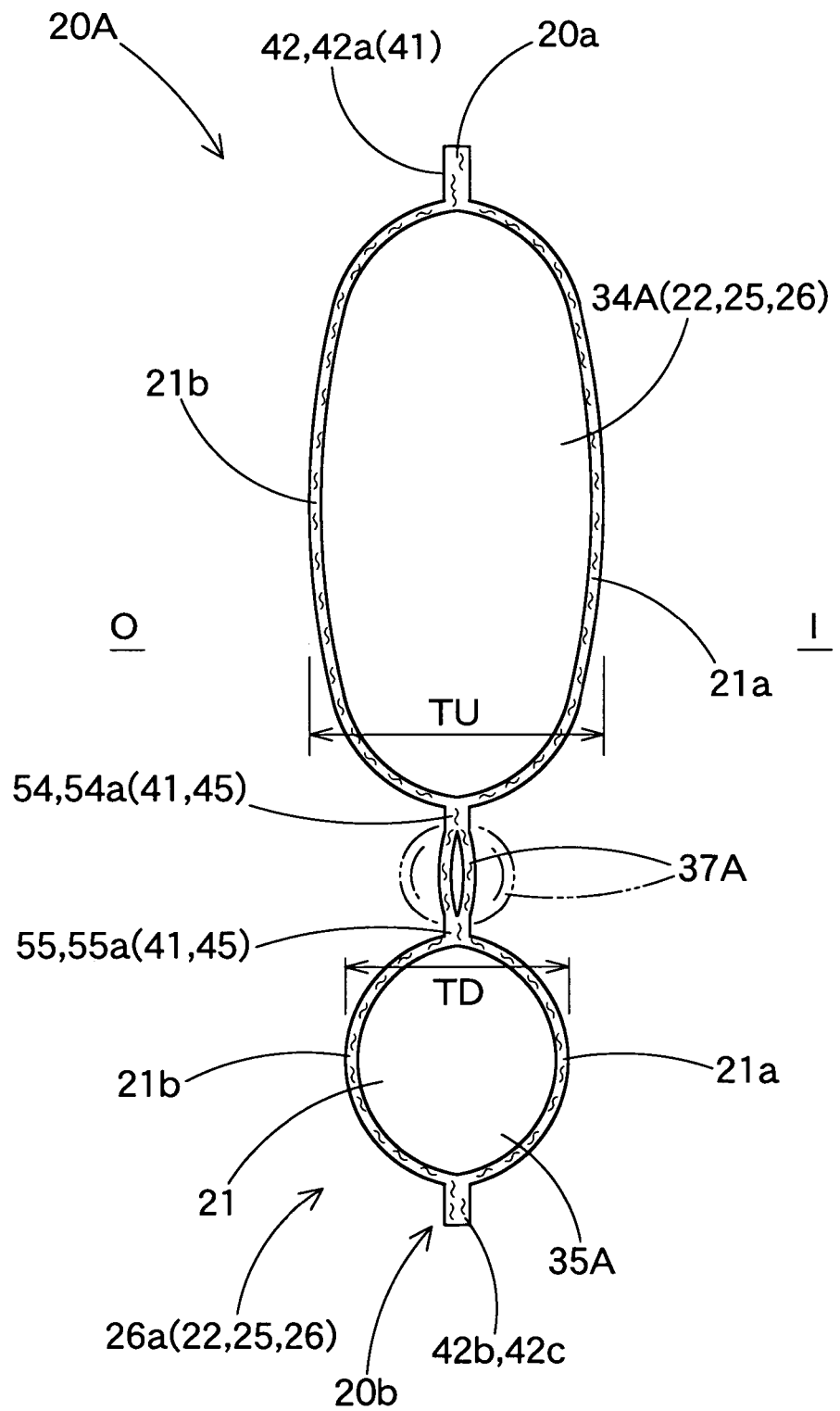
FIG. 11 is a vertical section taken along line XI-XI of FIG. 9 at full deployment of a primary inflatable portion.
Figure 12:
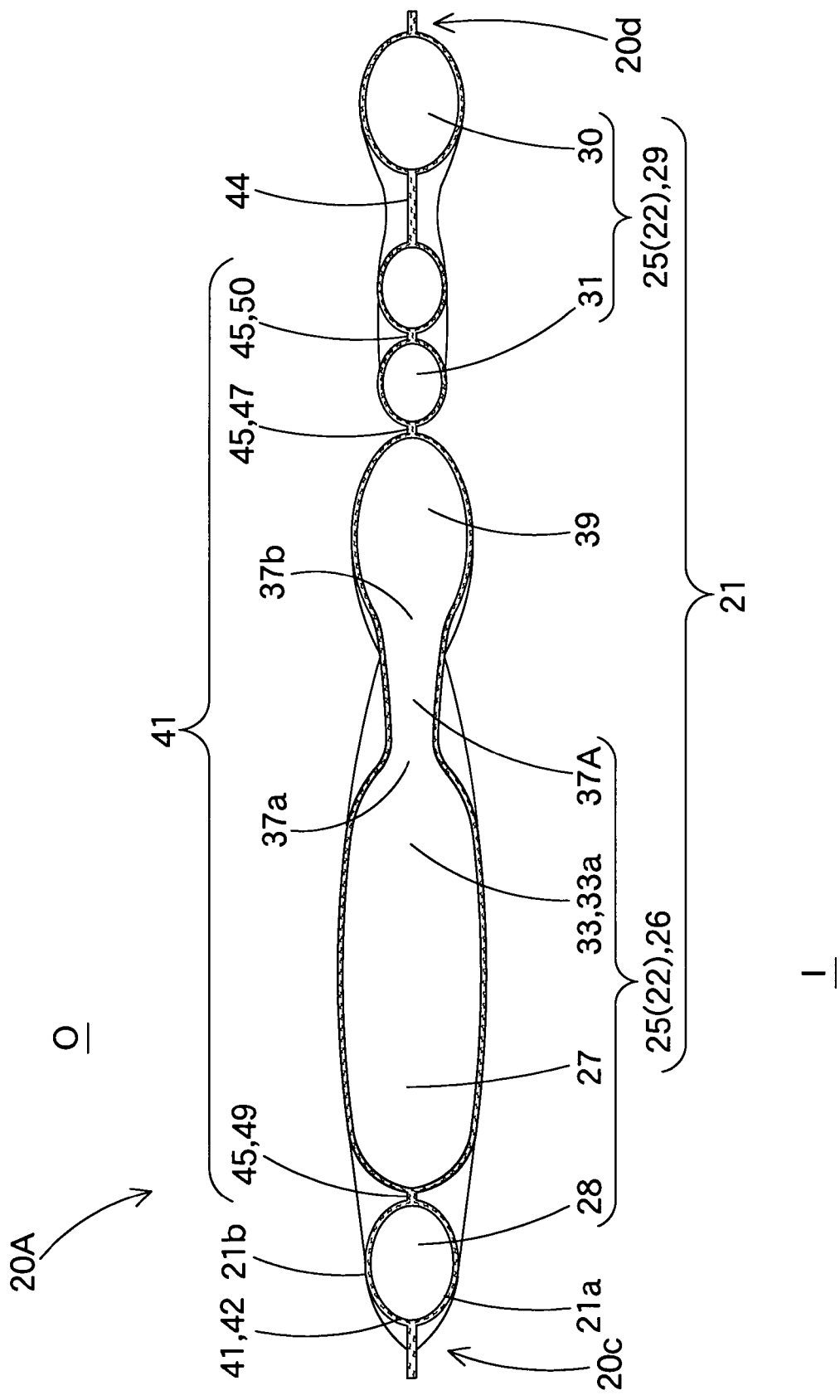
FIG. 12 is a horizontal section taken along line XII-XII of FIG. 9 at full deployment of the airbag of the second embodiment including a secondary inflatable portion.

In the second embodiment, the conduit 37A is liable to receive an occupant's head H since it is located at a generally intermediate position in a vertical direction of the front protection portion 26. However, with the opening dimensions dU and dD in a vertical direction greater than that of the conduit 37A, the upper inflatable portion 34A and lower inflatable portion 35A secure thicknesses TU and TD at inflation thicker than the conduit 37A as shown in FIG. 11. Accordingly, even in the event that the occupant's head H approaches the location of the conduit 37A immediately after the deployment of the primary inflatable portion 22, the head H is received by the inflatable portions 34A and 35A securely, thus the conduit 37A is not occluded and smoothly feeds the inflation gas G to the secondary inflatable portion 39.

Figure 15:
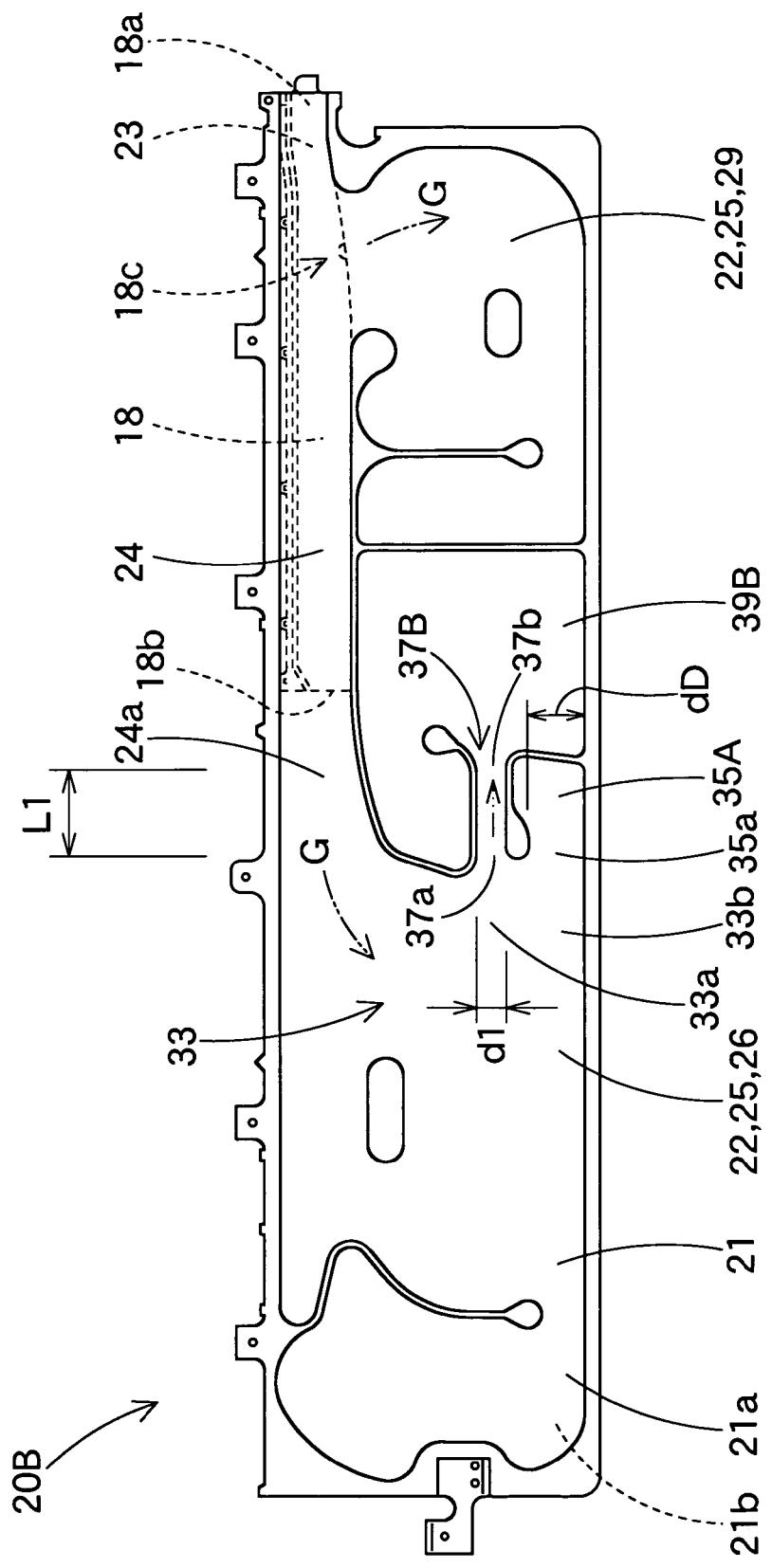
FIG. 15 is a front view of a modification of the airbag of the second embodiment.

The airbags 20 and 20A of the foregoing embodiments have been described as include above the conduit 37/37A the upper inflatable portions 34/34A that is communicated with the inlet-side inflatable portion 33. Alternatively, if the conduit is located in an area that is not expected to engage an occupant's head, part of the peripheral portion of the non-admissive portion or part of the secondary inflatable portion may be located above the conduit instead of the primary inflatable portion. By way of example in an airbag 20B shown in FIG. 15, part of a secondary inflatable portion 39B, not part of the primary inflatable portion 22, is located above a conduit 37B in communication with an outlet port 37b of the conduit 37B.

Figure 16:
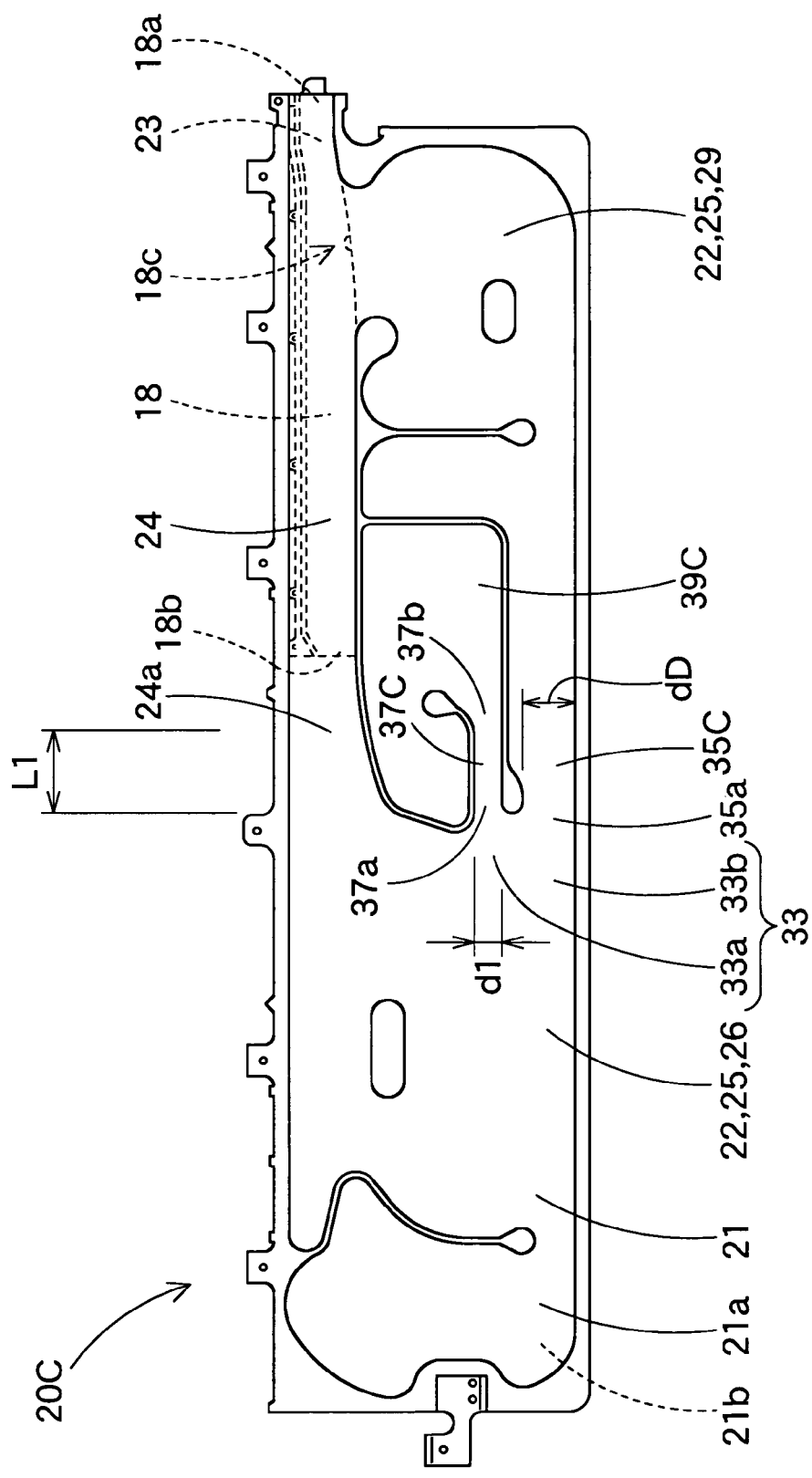
FIG. 16 is a front view of another modification of the airbag of the second embodiment.

In the airbags 20 and 20A of the foregoing embodiments, the rear end (or an end facing away from the communication port 35a with the inlet-side inflatable portion 33) of the lower inflatable portion 35/35A is blocked off by the vertical line portion 48 of the partitioning portion 45 that partitions the lower inflatable portion 35/35A and the secondary inflatable portion 39. Alternatively, however, as an airbag 20C shown in FIG. 16, the lower inflatable portion 35C may be so formed to communicate with the rear inflatable portion 29 that is located on the opposite side of the front protection potion 26 communicated with the conduit 37C relative to the secondary inflatable portion 39C. At this time, the opening dimension dD in a vertical direction of the lower inflatable portion 35C should be set such that the lower inflatable portion 35C retains its shape and does not cause an occlusion of the conduit 37C when the lower periphery 20b of the airbag 20 moves upward on the rebound of deployment immediately after the completion of deployment of the primary inflatable potion 22.

In the first and second embodiments, the length L1 in an anteroposterior direction of the conduit 37/37A is 30 to 120 mm, and the opening dimension dM/d1 in a vertical direction of the conduit 37/37A is 30 to 60 mm. The opening dimension dD in a vertical direction of the lower inflatable portion 35/35A/35C is desirably 80 mm and above so as not to cause an occlusion of the conduit 37/37A/37B/37C at the rebound of the lower periphery 20b of the airbag 20.

Although the conduits 37 and 37A of the first and second embodiments have been described as communicated with the front protection portion 26, the conduit may be formed in communication with the rear protection portion 29 having an inlet-side inflatable portion.

Although the airbags 20 and 20A of the foregoing embodiments have been described as having a hollow-weave or one-piece woven construction, the airbag may be manufactured by sewing an inner panel 21a and an outer panel 21b together.

What is claimed is:

1. A head-protecting airbag adapted to be mounted on an upper periphery of a window of a vehicle inside the vehicle for deployment downward to cover the window, the airbag comprising:
   a gas admissive portion inflatable with inflation gas by separating an inner panel and an outer panel, the gas admissive portion including:
   a primary inflatable portion inflatable in an early stage of airbag deployment, the primary inflatable portion including a protection portion that receives and protects a head of an occupant and a conduit that is tubular in shape and extends from the protection portion along an anteroposterior direction of the airbag, the conduit being located in an upper area of the airbag away from a lower periphery of the airbag; and
   a secondary inflatable portion that is communicated with the primary inflatable portion by the conduit and admits inflation gas from the primary inflatable portion for restraining a pressure increase of the primary inflatable portion, the secondary inflatable portion being located adjacent the protection portion of the primary inflatable portion in an anteroposterior direction of the airbag at full deployment, and
   a non-admissive portion that admits no inflation gas and keeps the inner panel and outer panel attached together, the non-admissive portion including:
   a peripheral portion located on an outer periphery of the gas admissive portion; and
   a partitioning portion that defines boundaries of the secondary inflatable portion and the conduit,
   wherein the protection portion includes:
   an inlet-side inflatable portion located proximate an inlet port of the conduit, the inlet-side inflatable portion including an opposing region that is communicated with and adjacent the inlet port of the conduit in an anteroposterior direction and a lower extending region that extends downward from the opposing region; and
   a lower inflatable portion that is partitioned from the conduit by the partitioning portion and located below the conduit between the conduit and a bottom area of the peripheral portion, the lower inflatable portion being communicated with the lower extending region so as to be inflatable generally simultaneously with the inlet-side inflatable portion upon inflation of the primary inflatable portion and having a dimension in a vertical direction over an entire area below the conduit in a flattened and uninflated state of the airbag that is greater than a dimension in the vertical direction of the conduit, wherein:

the partitioning portion includes an upper boundary portion that defines an upper boundary of the conduit and a lower boundary portion that defines a lower boundary of the conduit with the lower inflatable portion;

the inlet-side inflatable portion further includes an upper extending region that extends upward from the opposing region; and the primary inflatable portion further includes an upper inflatable portion located above the conduit and partitioned from the conduit by the upper boundary portion, the upper inflatable portion being communicated with the upper extending region so as to be inflatable generally simultaneously with the inlet-side inflatable portion and lower inflatable portion upon inflation of the primary inflatable portion and having the dimension in the vertical direction in the flattened and uninflated state of the airbag that is greater than that of the conduit over an entire area above the conduit, there being only one of the conduit included in the primary inflatable portion, the conduit being located in front of the secondary inflatable portion, the inlet port of the conduit being located at a front end of the conduit for admitting inflation gas from the opposing region of the inlet-side inflatable portion, the conduit including, at a rear end thereof, an outlet port that feeds the inflation gas to the secondary inflatable portion, the secondary inflatable portion inflates with the inflation gas fed from the conduit after the upper inflatable portion, the inlet-side inflatable portion and the lower inflatable portion complete inflation.

2. The head-protecting airbag of claim 1, wherein:
the conduit is located proximate an upper end of the secondary inflatable portion;
the primary inflatable portion further includes a gas feed passage that extends in an anteroposterior direction along an upper periphery of the airbag for feeding inflation gas to the protection portion; and
a leading end region of the gas feed passage acts as the upper inflatable portion.

3. The head-protecting airbag of claim 1, wherein:
the conduit is located at an intermediate position in a vertical direction of the secondary inflatable portion;
the primary inflatable portion further includes a gas feed passage that extends in an anteroposterior direction along an upper periphery of the airbag for feeding inflation gas to the protection portion; and
the upper inflatable portion is communicated with a leading end region of the gas feed passage.

4. The head-protecting airbag of claim 1, wherein:
the airbag includes two of the protection portions that are located in front and at the rear of the secondary inflatable portion; and
the conduit is formed in such a manner as to project into either one of the protection portions and is located at a vicinity of a center of the airbag in an anteroposterior direction together with the secondary inflatable portion.

5. The head-protecting airbag of claim 4, wherein:
the two protection portions are so provided as to cover two windows of the vehicle located in front and rear of a pillar of the vehicle; and
the conduit is located between the protection portions so as to be deployable on an interior of the pillar.

6. The head-protecting airbag of claim 1, wherein:
the airbag includes two of the protection portions that are located in front and at the rear of the secondary inflatable portion; and
the lower inflatable portion communicates the two protection portions.

7. The head-protecting airbag of claim 1, wherein:
a length in an anteroposterior direction of the conduit is greater than the dimension in the vertical direction of the conduit in the flattened and uninflated state of the airbag.

8. The head-protecting airbag of claim 7 wherein the length in an anteroposterior direction of the conduit is 30 to 120 mm.

9. The head-protecting airbag of claim 7 wherein the dimension in the vertical direction of the conduit in the flattened and uninflated state of the airbag is 30 to 60 mm.

10. The head-protecting airbag of claim 1, wherein:
the partitioning portion includes at a leading end at a side of the inlet port of the conduit a projecting portion that bulges inward of the conduit in a generally round shape and has a greater width than a portion immediately adjacent the leading end; and
the conduit has a reduced opening dimension at the inlet port relative to at an outlet port to the secondary inflatable portion due to the projecting portion.

* * * * *